(12) United States Patent
Tsujiguchi

(10) Patent No.: US 7,734,773 B2
(45) Date of Patent: Jun. 8, 2010

(54) WEB SYSTEM, COMMUNICATION CONTROL DEVICE, AND STORAGE MEDIUM

(75) Inventor: Yuuichiroh Tsujiguchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 212 days.

(21) Appl. No.: 11/906,974

(22) Filed: Oct. 3, 2007

(65) Prior Publication Data

US 2008/0301277 A1 Dec. 4, 2008

(30) Foreign Application Priority Data

Oct. 5, 2006 (JP) ............................. 2006-274020

(51) Int. Cl.
*G06F 15/173* (2006.01)
(52) U.S. Cl. ............................... 709/224; 710/8; 704/3; 345/760
(58) Field of Classification Search ................. 709/223, 709/224
See application file for complete search history.

(56) References Cited

U.S. PATENT DOCUMENTS

| | | | |
|---|---|---|---|
| 7,551,302 B2 * | 6/2009 | Oki et al. ................... 358/1.15 |
| 2002/0143523 A1 * | 10/2002 | Balaji et al. ..................... 704/8 |
| 2003/0115186 A1 * | 6/2003 | Wilkinson et al. ............. 707/3 |
| 2004/0133416 A1 * | 7/2004 | Fukuoka et al. ................ 704/3 |
| 2004/0205260 A1 * | 10/2004 | Oki et al. ........................ 710/8 |
| 2004/0210841 A1 * | 10/2004 | Takahashi ................... 715/536 |
| 2008/0189172 A1 * | 8/2008 | Goren et al. .................. 705/14 |
| 2008/0189423 A1 * | 8/2008 | Takahashi et al. ........... 709/227 |

FOREIGN PATENT DOCUMENTS

| | | |
|---|---|---|
| JP | 2002-259075 | 9/2002 |
| JP | 2003-76502 | 3/2003 |
| JP | 2004-185593 | 7/2004 |
| JP | 2004-185594 | 7/2004 |
| JP | 2004-185595 | 7/2004 |
| JP | 2004-213462 | 7/2004 |
| JP | 2006-25127 | 1/2006 |

* cited by examiner

*Primary Examiner*—Wing F Chan
*Assistant Examiner*—Kostas Katsikis
(74) *Attorney, Agent, or Firm*—Cooper & Dunham LLP

(57) ABSTRACT

A disclosed Web system includes an image forming apparatus; a communication control device connected to the image forming apparatus and including a print server function; and an information processing apparatus connected via a network and the communication control device to the image forming apparatus and configured to obtain information on the image forming apparatus in the form of Web information from the communication control device. The information processing apparatus includes a Web information request unit configured to send an information request to the communication control device to obtain the Web information, the information request including a language identifier. The communication control device includes a Web information storing unit configured to store the Web information, and a Web information returning unit configured to retrieve the Web information corresponding to the language identifier from the Web information storing unit and to send the retrieved Web information to the information processing apparatus.

10 Claims, 18 Drawing Sheets

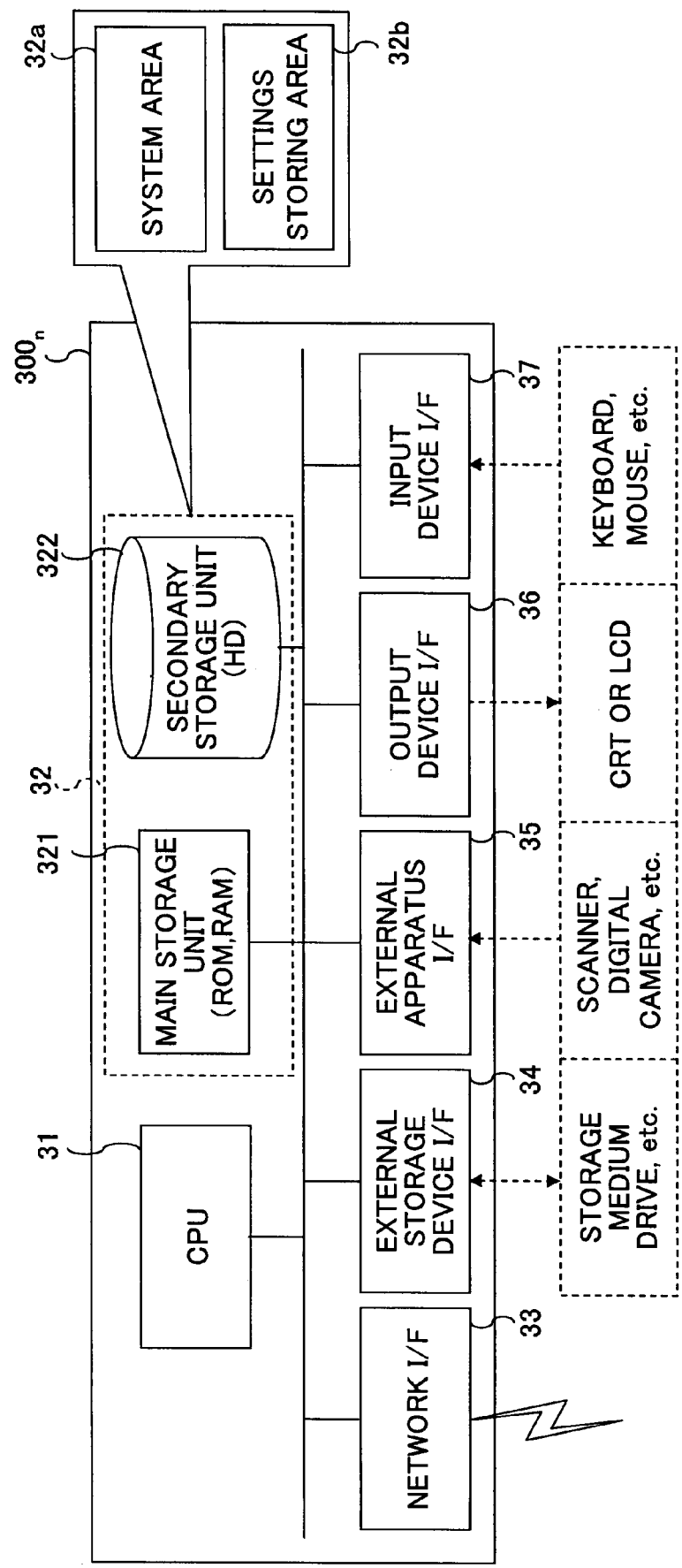

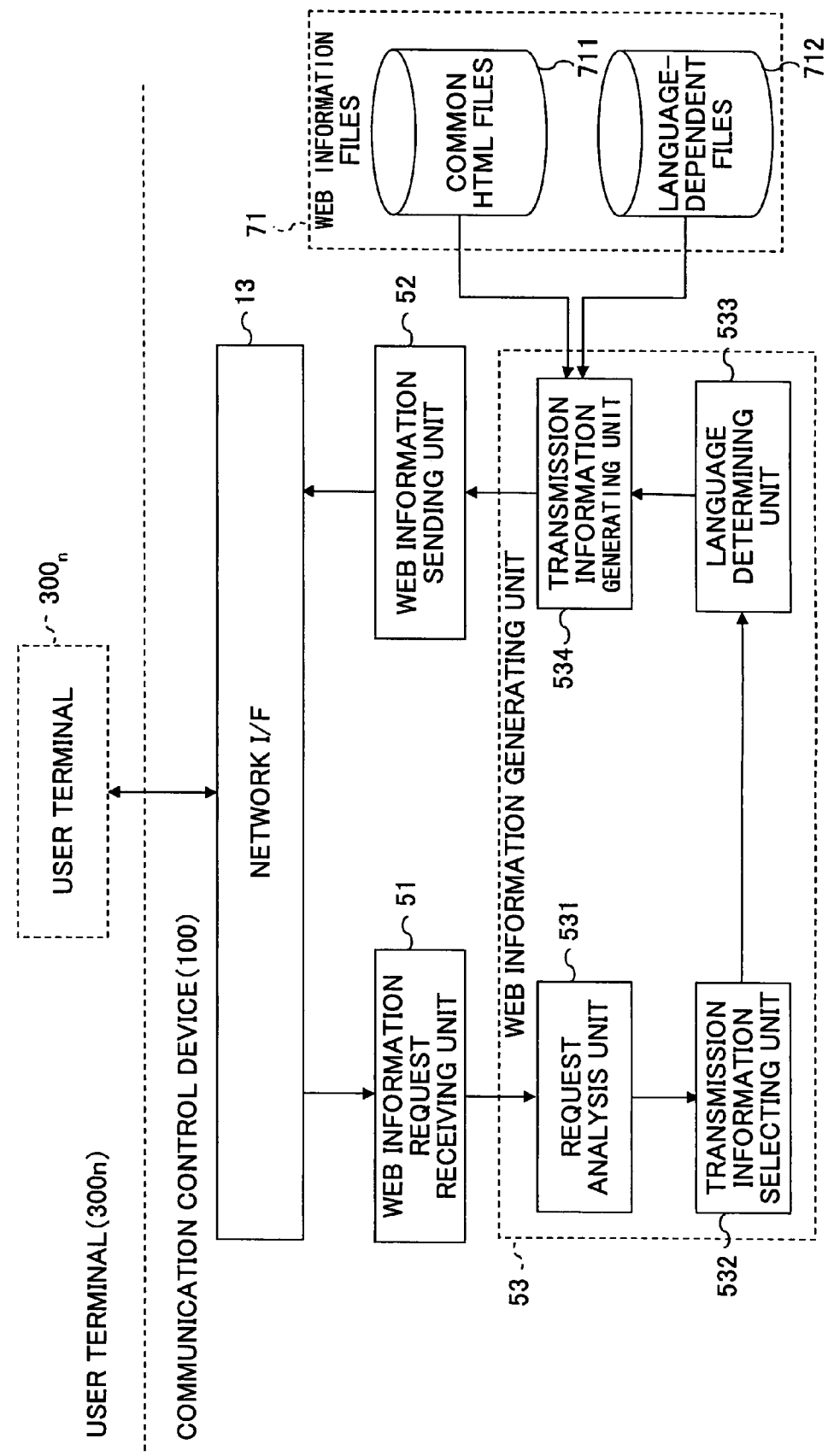

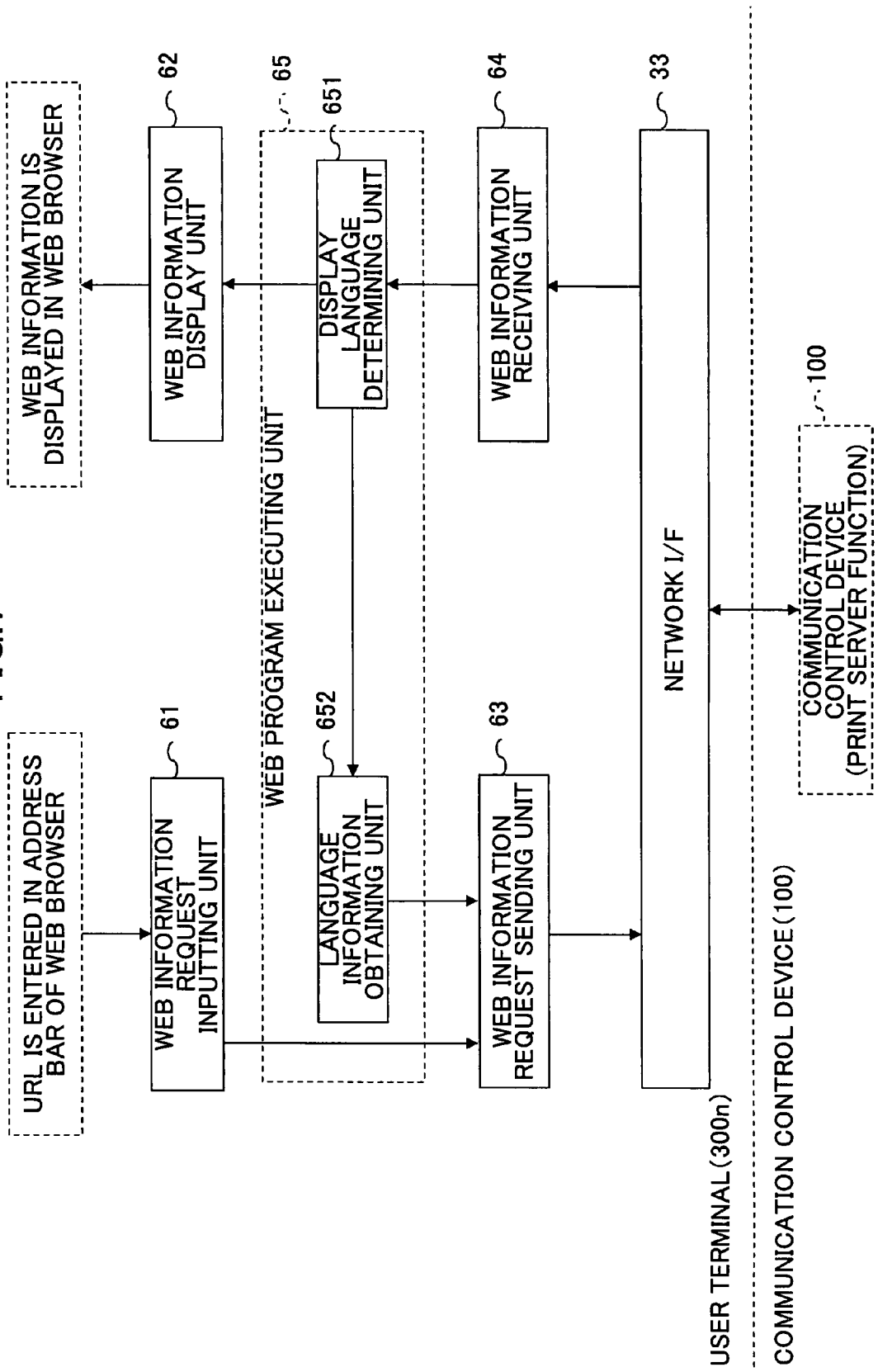

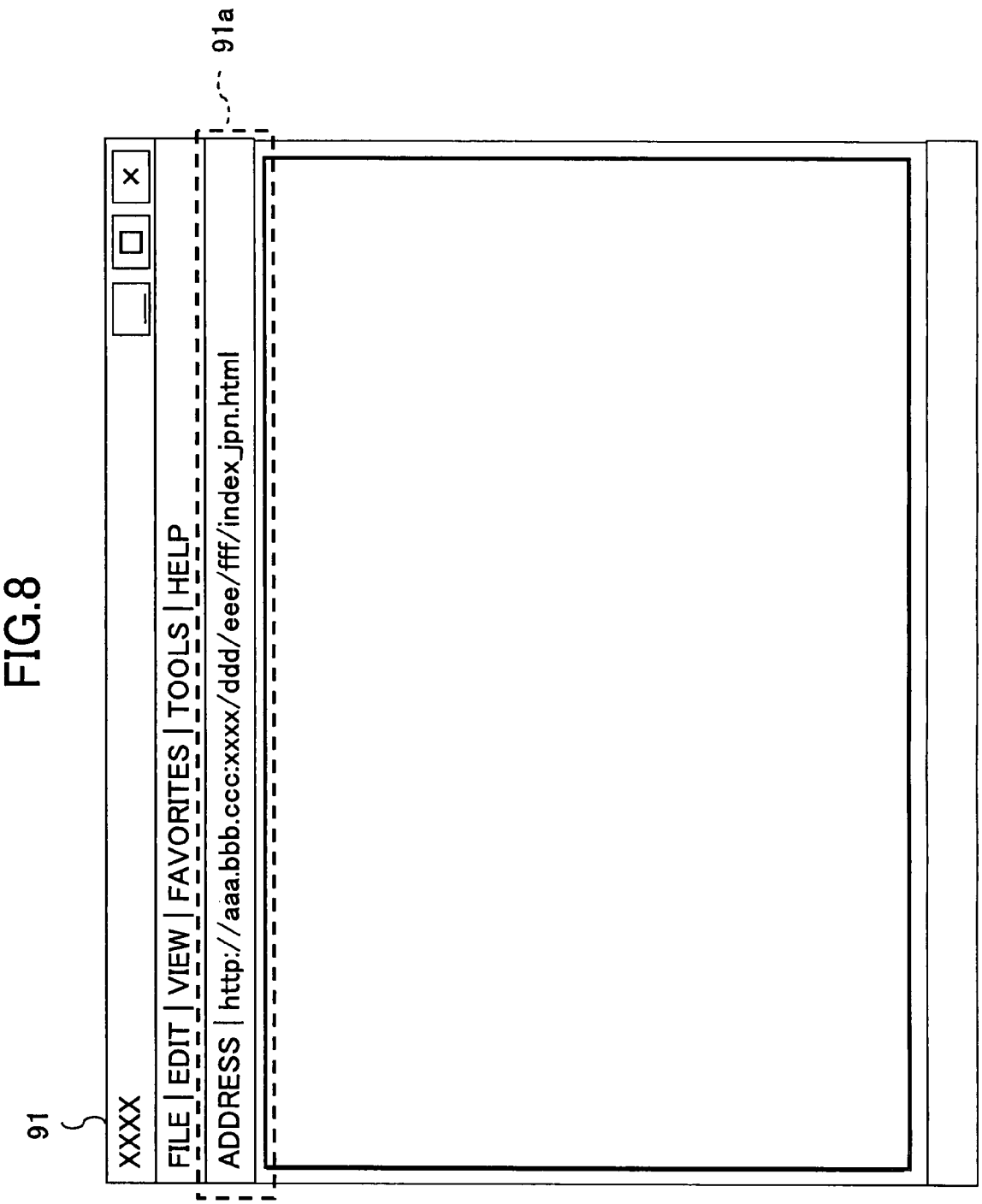

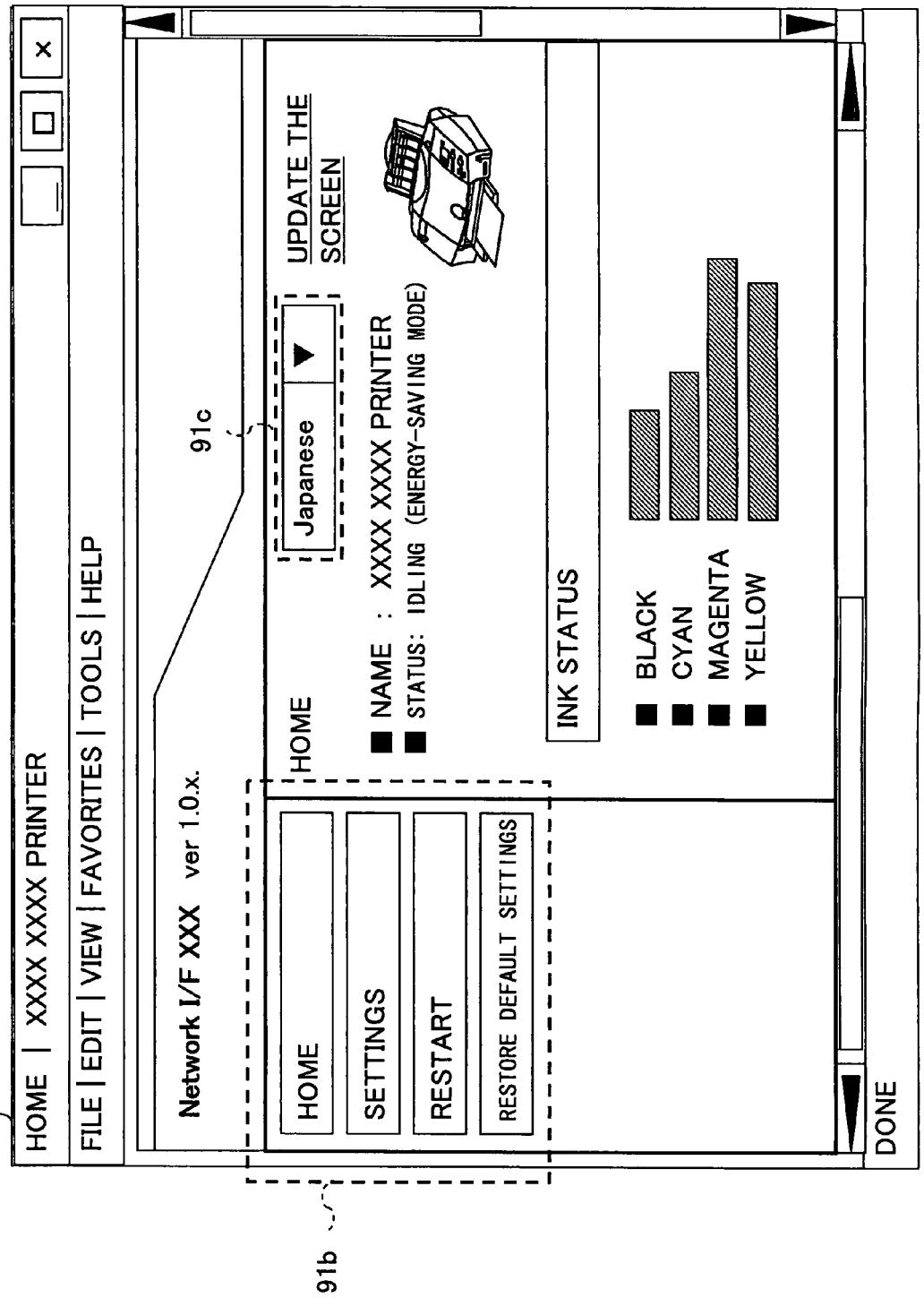

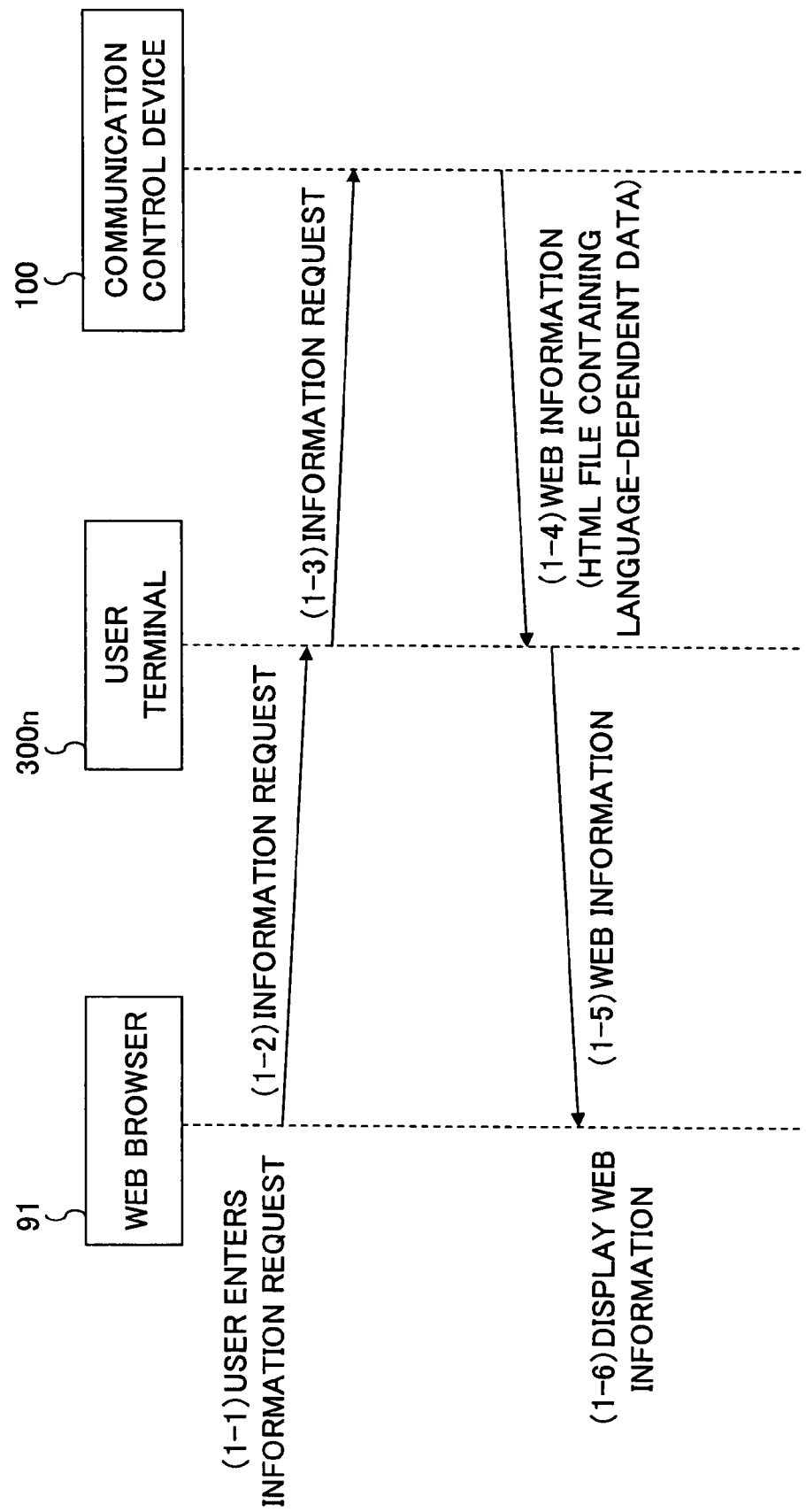

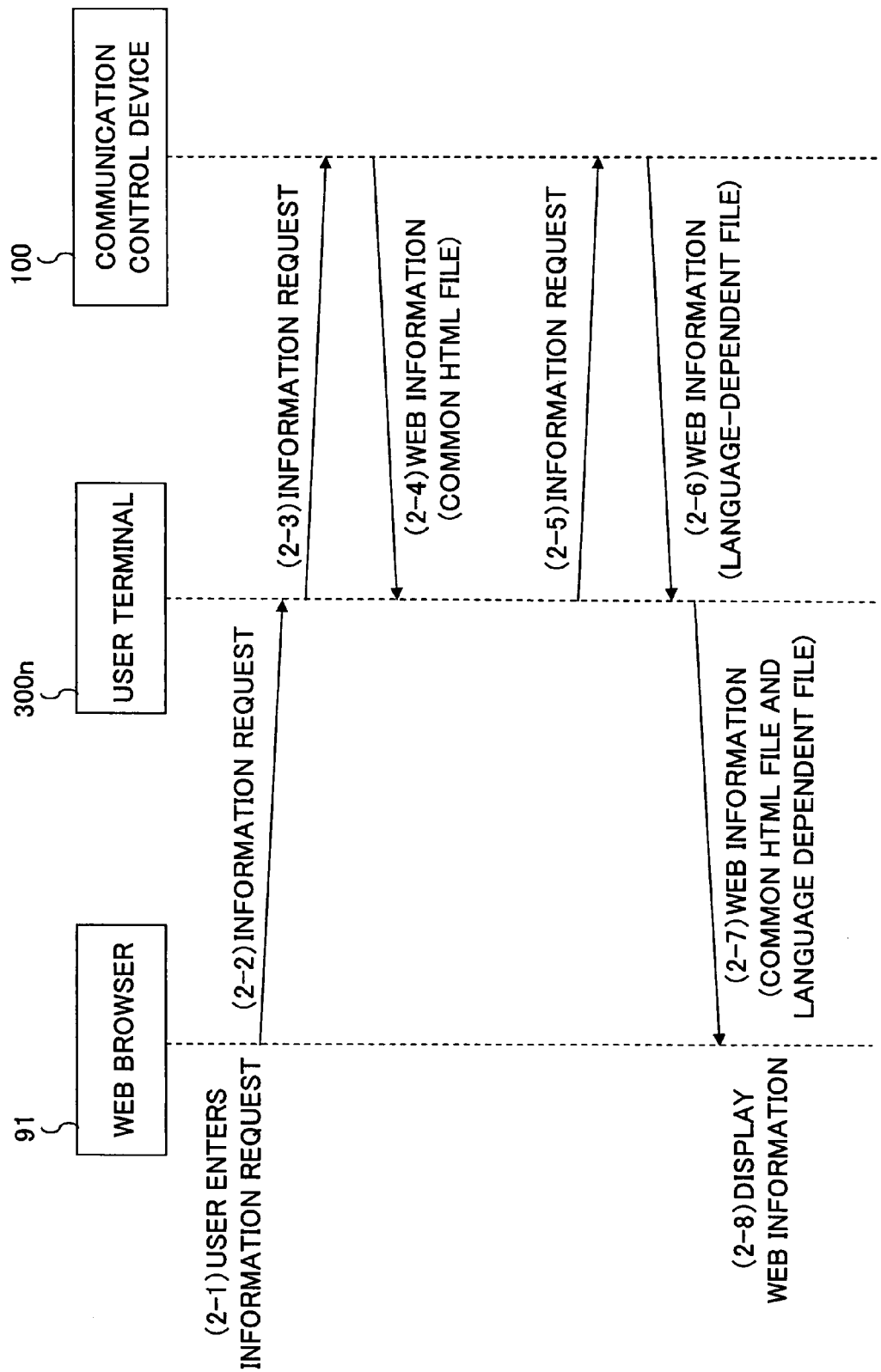

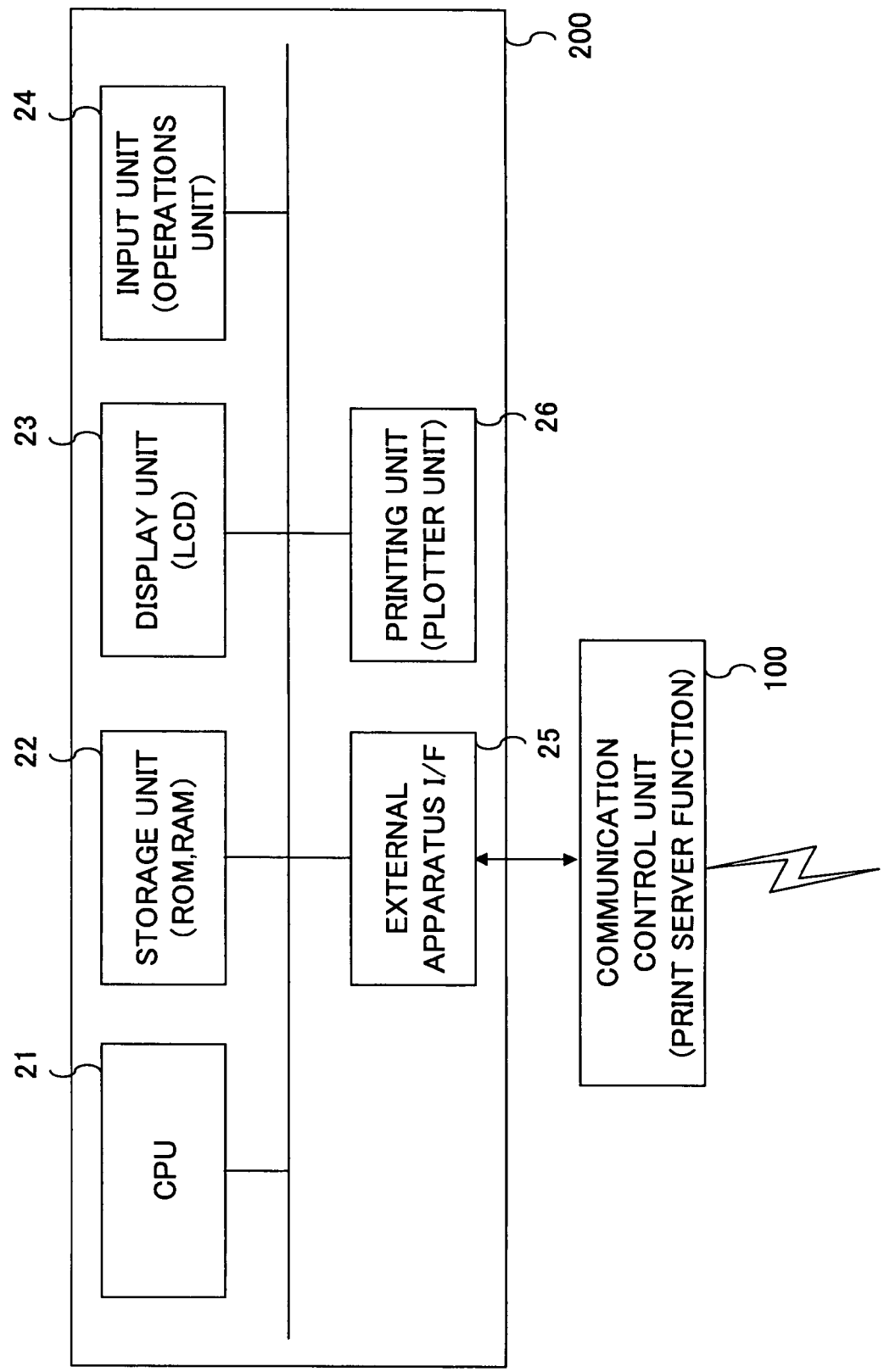

WEB SYSTEM, COMMUNICATION CONTROL DEVICE, AND STORAGE MEDIUM

BACKGROUND

1. Technical Field

This disclosure generally relates to a Web system that comprises an image forming apparatus connected to a communication control device having a print server function that provides a Web server service.

2. Description of the Related Art

Recently manufactured image forming apparatuses are normally enabled to receive data from user terminals such as personal computers (PCs) via a network such as a local area network (LAN) using protocols such as Transmission Control Protocol/Internet Protocol (TCP/IP), Simple Network Management Protocol (SNMP), Hypertext Transfer Protocol (HTTP), and Telnet. Such an image forming apparatus is equipped with a communication control device, such as a network interface card (NIC) inserted into an expansion slot of the image forming apparatus, to enable data communications with other devices connected via a network.

A NIC may include a print server function that manages an image forming apparatus, such as a printer, connected to the NIC and enables information processing apparatuses equipped with communication devices to share and use the image forming apparatus via a network. The print server function receives print requests from the information processing apparatuses, i.e. user terminals, and causes the image forming apparatus to process the print requests in sequence. When a user terminal is connected to an image forming apparatus via a NIC including a print server function, the user terminal is freed from a printing task as soon as it sends print data to the NIC where the print data are spooled and processed. Thus, compared with a case where a user terminal is connected directly to an image forming apparatus, the above configuration reduces the load of a user terminal in a printing process. Also, a print server function may be configured to provide a Web server service that enables user terminals to display the status and other information on an image forming apparatus and to display and set configurations of an image forming apparatus via a Web user interface such as a Web browser. Incorporating such a print server function in a NIC of an image forming apparatus improves the usability of a printing system.

One problem in incorporating such functionality in a NIC is that Web contents (programs and data) for providing the functionality consume large amounts of storage space and therefore causes a shortage of storage space in the NIC.

Patent document 1 discloses a printing apparatus including a printing unit and a network card. In the disclosed printing apparatus, machine-dependent Web contents are stored in the printing unit and machine-independent Web contents are stored in the network card. In other words, Web contents are divided and stored in multiple locations to save storage space in the network card.

[Patent document 1] Japanese Patent Application Publication No. 2002-259075

Meanwhile, Web contents (for example, Hypertext Markup Language (HTML) files) for displaying information on an image forming apparatus are preferably provided in multiple languages so as to be able to provide information to users of various nationalities. However, in this case, since multilingualization increases the data size of Web contents, dividing Web contents into machine-dependent contents and machine-independent contents and storing them separately in an image forming apparatus and a NIC as disclosed in patent document 1 alone is not enough to solve the shortage of storage space in a NIC.

The data size of Web contents, i.e. multilingual HTML files, increases as the number of languages increases and this makes it difficult to store those HTML files in a small-capacity storage device, such as a read-only memory (ROM) or a random access memory (RAM), of a NIC. One method to solve this problem is to limit the Web contents to minimum necessary information items or to remove some functions that consume storage space. If this method is not enough to solve the problem, it is necessary to increase the storage capacity of a NIC by, for example, installing another storage device or by replacing the current storage device with a high-capacity storage device. However, increasing the storage capacity of a NIC increases the production costs.

BRIEF SUMMARY

In an aspect of this disclosure, there is provided a Web system including an image forming apparatus; a communication control device connected to the image forming apparatus and including a print server function; and an information processing apparatus connected via a network and the communication control device to the image forming apparatus and configured to obtain information on the image forming apparatus in the form of Web information from the communication control device and to display the Web information in a Web browser of itself. The information processing apparatus includes a Web information request unit configured to send an information request to the communication control device to obtain the Web information, the information request including a language identifier indicating a language to be used to display the Web information in the Web browser. The communication control device includes a Web information storing unit configured to store the Web information, and a Web information returning unit configured to retrieve the Web information corresponding to the language identifier from the Web information storing unit based on the information request sent from the Web information request unit and to send the retrieved Web information to the information processing apparatus.

In another aspect of this disclosure, there is provided a communication control device connected to an image forming apparatus and including a print server function for sending information on the image forming apparatus in the form of Web information to an information processing apparatus where the Web information is displayed in a Web browser. The communication control device includes a storage unit configure to store the Web information; a Web information request receiving unit configured to receive an information request for the Web information from the information processing apparatus; a Web information generating unit configured to retrieve the Web information from the storage unit based on the information request and to generate transmission information from the retrieved Web information; and a Web information sending unit configured to send the generated transmission information to the information processing apparatus.

In another aspect of this disclosure, there is provided a storage medium having program code embodied therein for causing a computer to perform a print server function of a communication control device connected to an image forming apparatus and including a storage unit for storing information on the image forming apparatus in the form of Web information, which print server function sends the Web information to an information processing apparatus where the Web information is displayed in a Web browser. The program code includes a Web information request receiving code unit configured to receive an information request for the Web information from the information processing apparatus; a Web information generating code unit configured to retrieve the Web information from the storage unit based on the information request and to generate transmission information from the retrieved Web information; and a Web information sending code unit configured to send the generated transmission information to the information processing apparatus.

BRIEF DESCRIPTION OF THE DRAWINGS

FIG. 4 is a block diagram illustrating a hardware configuration of an exemplary user terminal (information processing apparatus) according to an embodiment of the present invention;

FIG. 5 is a block diagram illustrating a functional configuration of the exemplary communication control device;

FIG. 7 is a block diagram illustrating a functional configuration of the exemplary user terminal (information processing apparatus);

FIG. 8 is a drawing illustrating an exemplary screen of a Web browser of the exemplary user terminal (information processing apparatus);

FIG. 9 is a drawing illustrating another exemplary screen of a Web browser of the exemplary user terminal (information processing apparatus);

FIG. 10 is a sequence chart showing a conventional Web information display process;

FIG. 11 is a sequence chart showing an exemplary Web information display process according to an embodiment of the present invention;

FIG. 18 is a block diagram illustrating a hardware configuration of a variation of the exemplary inkjet printer (image forming apparatus) according to an embodiment of the present invention.

DESCRIPTION OF THE PREFERRED EMBODIMENTS

Preferred embodiments of the present invention are described below with reference to the accompanying drawings.

<System Configuration>

Figure 1:
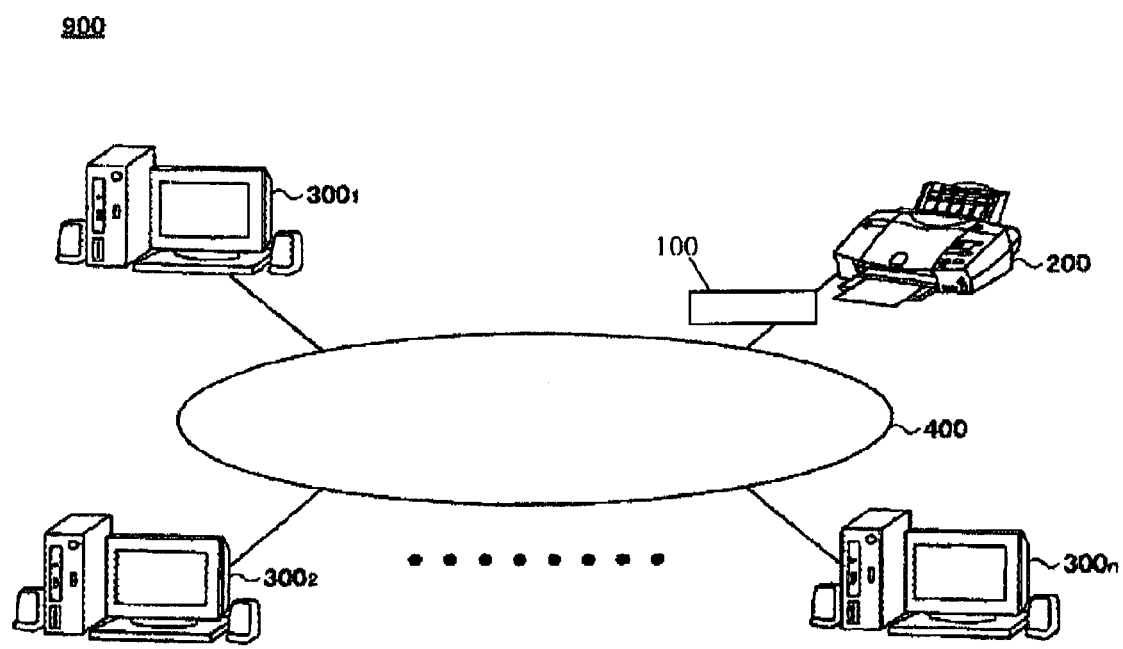
FIG. 1 is a drawing illustrating an exemplary Web system according to an embodiment of the present invention.

FIG. 1 is a drawing illustrating a Web system 900 according to an embodiment of the present invention.

As shown in FIG. 1, the Web system 900 comprises an inkjet printer (image forming apparatus) 200 connected to a communication control device 100 including a print server function that provides a Web server service and configured to print image data received via the communication control device 100 on paper, and user terminals (information processing apparatuses) 300n ($300_1$ through $300_n$) used by users to send print data to the inkjet printer 200 or to view various information items on the inkjet printer 200. The inkjet printer 200 and the user terminals 300n are connected to each other via a network (data communications network) 400 such as a wired/wireless LAN or wide area network (WAN).

Each of the user terminals 300n of the Web system 900 includes a Web browser used to obtain information on the inkjet printer 200 from the print server function (or the Web server service) of the communication control device 100 and to display the obtained information. The print server function periodically collects information on the inkjet printer 200 and returns the collected information in the form of Web information (HTML files and data) in response to a request from the Web browser.

Thus, in the Web system 900 of this embodiment, information on the inkjet printer 200 is sent in the form of Web information to the user terminals 300n by the print server function of the communication control device 100.

<Hardware Configurations>

Figure 2:
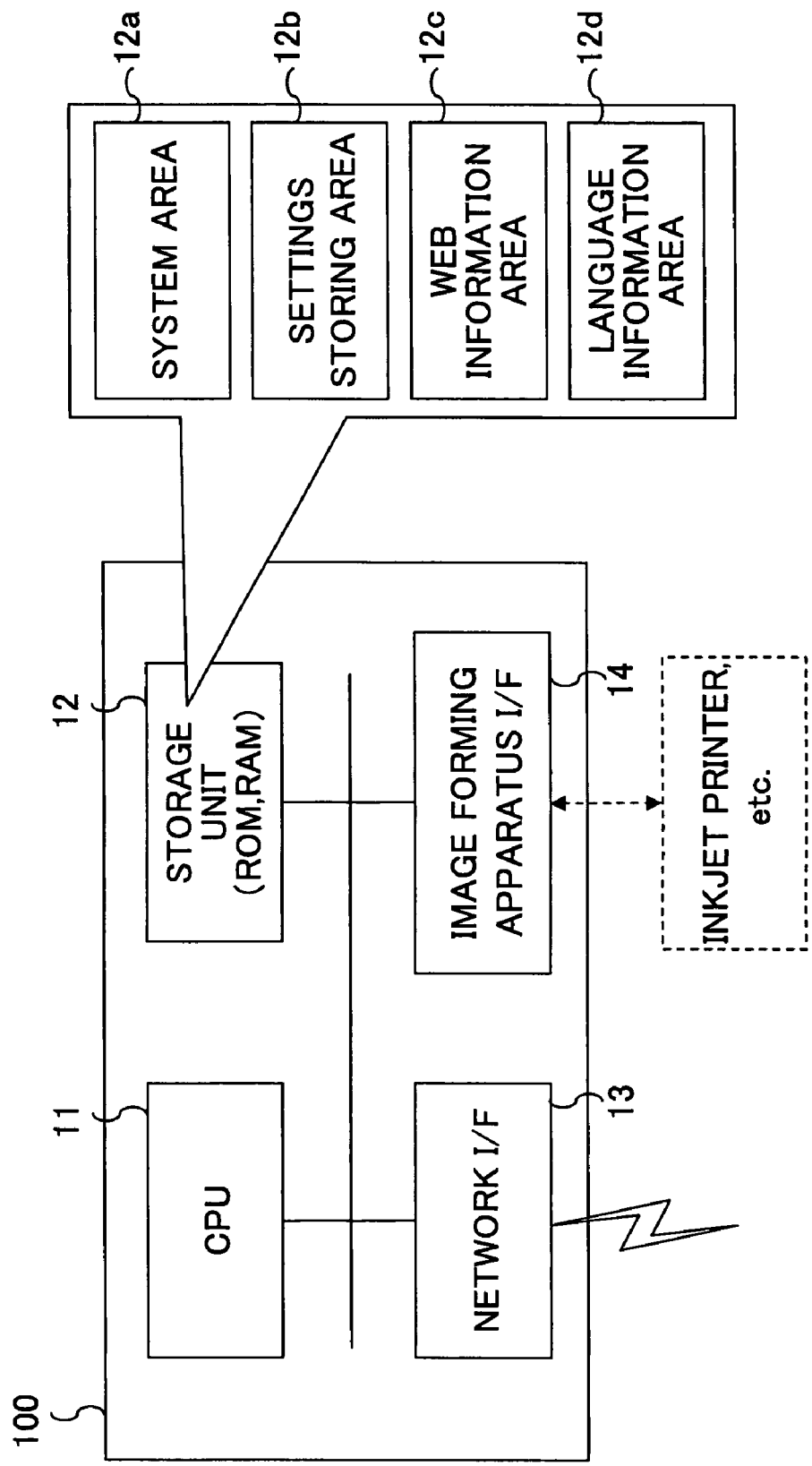
FIG. 2 is a block diagram illustrating a hardware configuration of an exemplary communication control device according to an embodiment of the present invention.

FIG. 2 is a block diagram illustrating a hardware configuration of the communication control device 100 of this embodiment.

As shown in FIG. 2, the communication control device 100 includes a central processing unit (CPU) 11, a storage unit 12, a network I/F 13, and an image forming apparatus I/F 14.

The CPU 11 processes data according to a program stored in the storage unit 12 and outputs the processing results to an output device or a storage device.

The storage unit 12, for example, includes a ROM for storing programs and data to be executed or processed by the CPU 11, and a RAM used to load the programs and data and to temporarily store processing results during processing by the CPU 11.

The storage area of the storage unit 12 is divided into a system area 12a for storing basic programs such as an operating system (OS) together with accompanying data, a settings storing area 12b for storing settings of various functions of the communication control device 100, a Web information area 12c for storing HTML files that are information display programs to be returned to a Web browser, and a language information area 12d for storing language-dependent files corresponding to languages used to display the HTML files on a Web browser. Thus, the storage unit 12 stores programs and data necessary for the operation of the communication control device 100.

The network I/F 13 is an interface to send/receive information (data) via the network 400 to/from other apparatuses having communication control devices.

The image forming apparatus I/F 13 is an interface to send/receive information (data) via a data transmission path to/from an image forming apparatus (for example, an inkjet printer).

The print server function of the communication control device 100 of this embodiment is implemented by a program stored in the ROM together with necessary data which program is to be loaded into the RAM and executed by the CPU 11.

Figure 3:
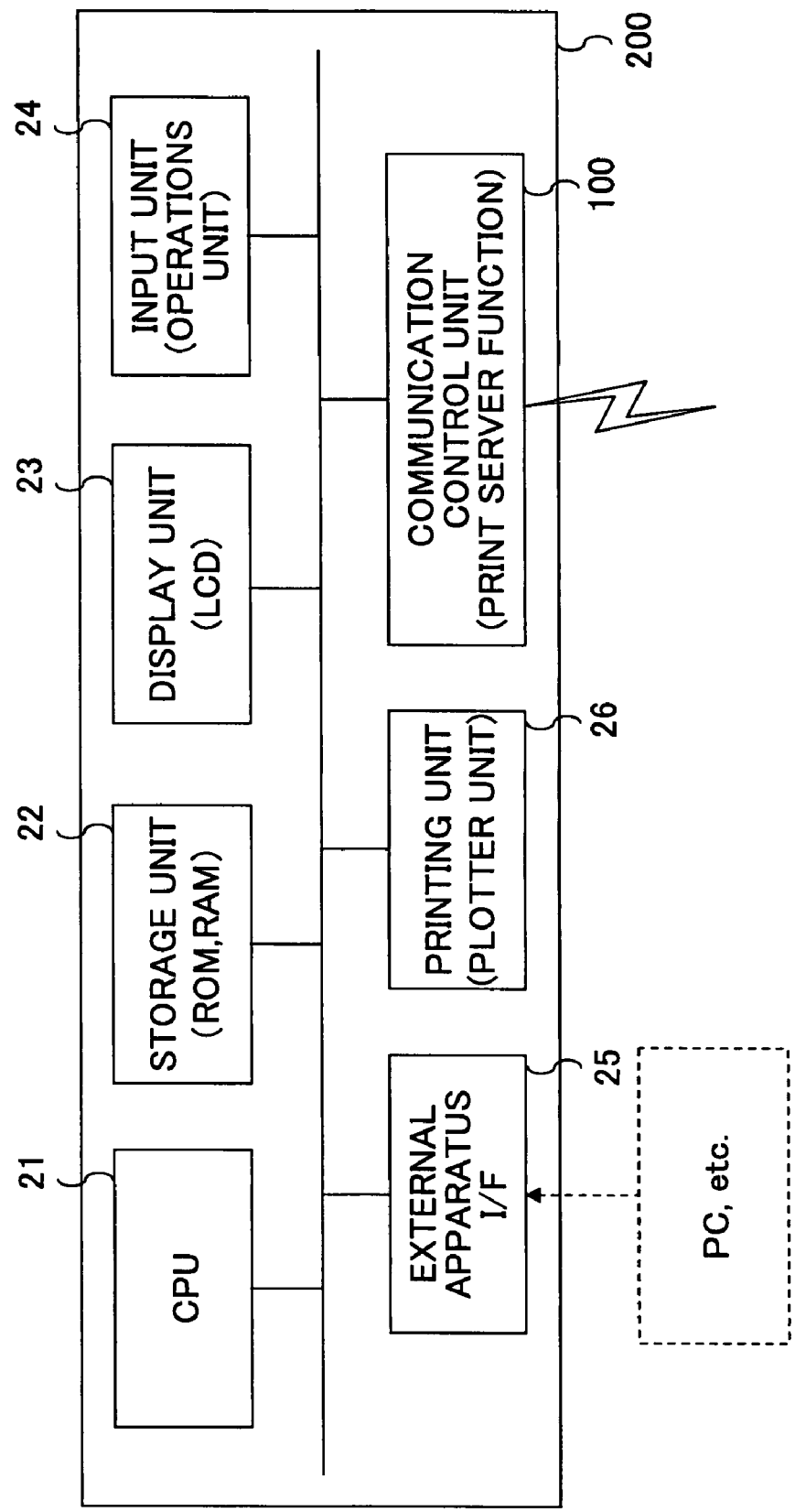
FIG. 3 is a block diagram illustrating a hardware configuration of an exemplary inkjet printer (image forming apparatus) according to an embodiment of the present invention.

FIG. 3 is a block diagram illustrating a hardware configuration of the inkjet printer 200 of this embodiment.

As shown in FIG. 3, the inkjet printer 200 includes a CPU 21, a storage unit 22, a display unit 23, an input unit (operations unit) 24, an external apparatus I/F 25, and a printing unit (plotter unit) 26.

The CPU 21 processes data according to a program stored in the storage unit 22 and outputs the processing results to an output device or a storage device.

The storage unit 22, for example, includes a ROM for storing programs and data to be executed or processed by the CPU 21, and a RAM used to load the programs and data and to temporarily store processing results during data processing by the CPU 21.

The display unit 23 comprises a liquid crystal display (LCD) and the input unit 24 comprises hard keys. The display unit 23 and the input unit 24 function as an interface for the user to, for example, make settings of the inkjet printer 200.

The external apparatus I/F 25 is an interface to send/receive data via a data transmission path, such as a universal serial bus (USB), to/from an external input apparatus (for example, a user terminal).

The printing unit 26 forms an image by an inkjet method and includes, for example, four recording heads, i.e. liquid jetting heads for jetting droplets of yellow (Y), cyan (C), magenta (M), and black (Bk) recording liquids, arranged in the main-scanning direction. When receiving print data (a raster image) generated by a printer driver installed in the user terminal 300n, the printing unit 26 prints the print data on a recording medium being fed in the sub-scanning direction by jetting recording liquids (inks) and a fixing liquid (fixing ink) from the recording heads.

The printing unit 26 forms an image by "cross-controlling" or synchronizing the movement in the main-scanning direction of a carriage having the recording heads and the movement in the sub-scanning direction of a recording medium carrier. More specifically, in a "cross control" method, the movement in the main-scanning direction (carriage return: CR) is started before the movement in the sub-scanning direction (line feed: LF) is completed so that the recording medium carrier is stopped just when the carriage reaches a recording area. The cross control method prevents the carriage from reaching the recording area while the recording medium carrier is moving and thereby prevents a skew (a phenomenon where a line formed by the recording heads becomes skewed with respect to the main-scanning direction). Also, the cross control method prevents unnecessary movement of the carriage that is not in parallel with the movement of the recording medium carrier and that does not contribute to formation of an image.

Also, as shown in FIG. 3, the inkjet printer 200 of this embodiment can accommodate the communication control device 100 shown in FIG. 2. For example, the communication control device 100 may be implemented as a network interface card that can be inserted into an expansion slot of the inkjet printer 200. With the communication control device 100, the inkjet printer 200 can receive print data via the network 400 from the user terminals 300n. Also, the print server function of the communication control device 100 makes it possible for the inkjet printer 200 to return various information items in response to requests from the user terminals 300n.

FIG. 4 is a block diagram illustrating a hardware configuration of the user terminal (information processing apparatus) 300n according to an embodiment of the present invention.

As shown in FIG. 4, the user terminal 300n includes a CPU 31, a storage unit 32, a network I/F 33, an external storage device I/F 34, an external apparatus I/F 35, an output device I/F 36, and an input device I/F 37.

The CPU 31 processes data according to a program stored in the storage unit 32 and outputs the processing results to an output device or a storage device.

The storage unit 32 includes a main storage unit 321 and a secondary storage unit 322 implemented by a hard disk (HD). The main storage unit 321, for example, includes a ROM for storing programs and data to be executed or processed by the CPU 31, and a RAM used to load the programs and data and to temporarily store processing results during data processing by the CPU 31. The secondary storage unit 322 stores basic software such as an OS and application software such as a Web browser together with accompanying data.

The storage area of the storage unit 32 comprises a system area 32a for storing basic programs such as an operating system (OS) together with accompanying data and a settings storing area 32b for storing settings of various functions of the user terminal 300n. Thus, the storage unit 32 stores programs and data necessary for the operation of the user terminal 300n.

The network I/F 33 is an interface to send/receive information (data) via the network 400 to/from other apparatuses having communication control devices.

The external storage device I/F 34 is an interface to send/receive information (data) via a data transmission path, such as a USB, to/from an external storage device (for example, a storage medium drive).

The external apparatus I/F 35 is an interface to receive data via a data transmission path from an external input apparatus (for example, a digital camera or a scanner).

The output device I/F 36 is an interface to send data via a data transmission path to an output device (for example, a CRT or liquid crystal display).

The input device I/F 37 is an interface to receive data via a data transmission path from an input device (for example, a keyboard or a mouse).

As described above, the Web system 900 of this embodiment includes the inkjet printer (image forming apparatus) 200 equipped with the communication control device 100 and the user terminals (information processing apparatuses) 300n.

<Functional Configurations>

In the Web system 900 of this embodiment, the user terminal (information processing apparatus) 300n can display information on the inkjet printer (image forming apparatus) 200 by accessing the Web server service of the print server function of the communication control device 100 using a Web browser. The information on the inkjet printer 200 is provided in multiple languages in a storage-efficient manner taking into account the storage capacity of the storage unit 12 of the communication control device 100. Exemplary functional configurations of the communication control device 100 and the user terminal 300n are described below with reference to FIGS. 5 through 9.

FIG. 5 is a block diagram illustrating a functional configuration of the communication control device 100 of this embodiment.

The communication control device 100 includes a Web information request receiving unit 51, a Web information sending unit 52, and a Web information generating unit 53.

The Web information request receiving unit 51 receives requests from the Web browser of the user terminal 300n and the Web information sending unit 52 sends information (Web information) on the inkjet printer 200 to be displayed in the Web browser to the user terminal 300n.

The Web information request receiving unit 51 receives via the network I/F 13 an information request (for example, resource location information such as a uniform resource locator (URL)) for information on the inkjet printer 200 from the user terminal 300n. The Web information sending unit 52 sends or returns information on the inkjet printer 200 obtained according to the information request via the network I/F 13 to the user terminal 300n.

The Web information generating unit 53 analyzes the information request received by the Web information request receiving unit 51, determines information to be returned based on the analysis result, generates the determined information, and sends the generated information to the Web information sending unit 52. The Web information generating unit 53 includes a request analysis unit 531, a transmission information selecting unit 532, a language determining unit 533, and a transmission information generating unit 534.

Formats of data handled by the request analysis unit 531, the transmission information selecting unit 532, the language determining unit 533, and the transmission information generating unit 534 are described below with reference to FIGS. 6A and 6B.

Figure 6A:
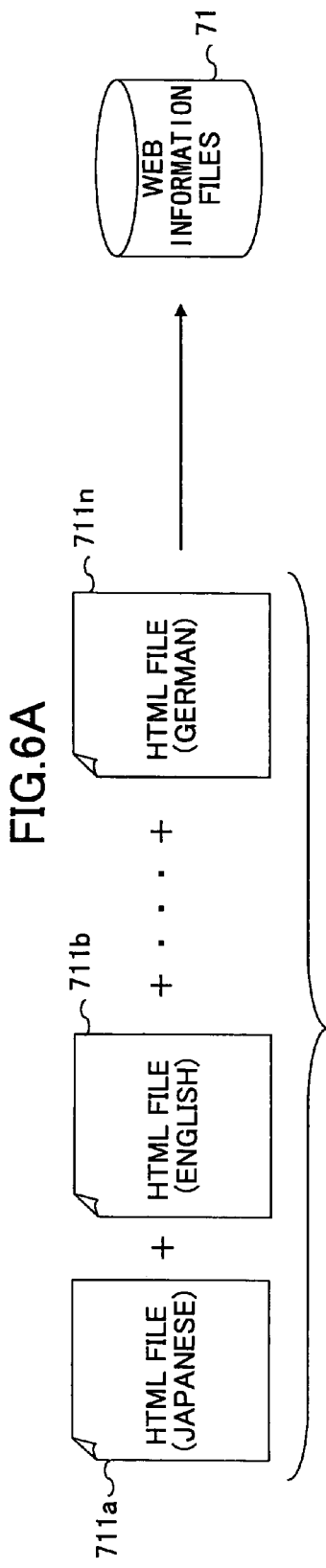
FIG. 6A is a drawing illustrating an exemplary configuration of multilingual Web information (Web information files) according to a conventional method.

FIG. 6A is a drawing illustrating an exemplary configuration of multilingual Web information (Web information files) according to a conventional method. FIG. 6B is a drawing illustrating an exemplary configuration of multilingual Web information (Web information files) used in the Web system 900 of this embodiment.

According to a conventional method, as exemplified in FIG. 6A, a Japanese HTML file 711a, an English HTML file 711b, a German HTML file 711n and so on are stored in a storage unit as Web information files 71. In other words, according to the conventional method, to provide information on an inkjet printer in multiple languages, HTML files each containing both program code and language-dependent data are necessary for the number of languages supported. With this conventional method, the total data size of the Web information files 71 increases as the number of supported languages increases and can be expressed by the following formula: total data size [bytes]=number of languages×(data size [bytes] of program code+data size [bytes] of language-dependent data).

Figure 6B:
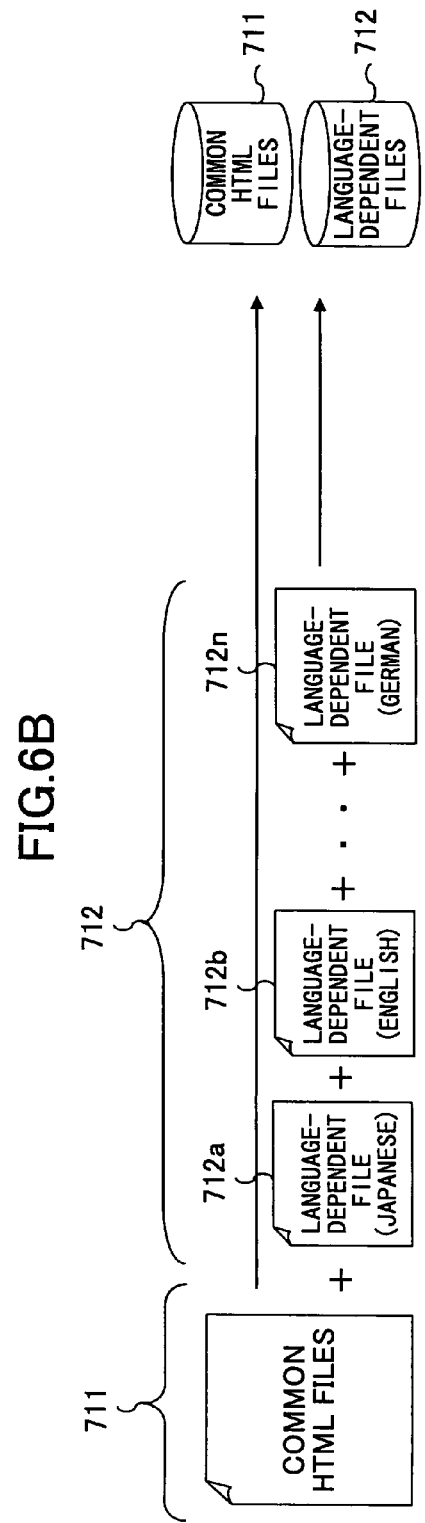
FIG. 6B is a drawing illustrating an exemplary configuration of multilingual Web information (Web information files) used in a Web system according to an embodiment of the present invention.

In the Web system 900 of this embodiment, as shown in FIG. 6B, Web information files 71 comprise common HTML files 711 and language-dependent files 712.

(1) Common HTML Files

The common HTML files 711 are information display program files coded in HTML and JavaScript ("Java" is a registered trademark of Sun Microsystems, Inc.) which are independent of languages and used to display information on the inkjet printer 200 in a Web browser. The common HTML files 711 are configured to layout and display various information items regarding the inkjet printer 200 in a user-friendly manner in the Web browser of the user terminal 300n. The common HTML files 711 are stored in the Web information area 12c (Web information storing unit) of the storage unit 12 of the communication control device 100.

(2) Language-Dependent Files

The language-dependent files 712 are data files containing language-dependent data representing information on the inkjet printer 200 in respective languages. Each of the language-dependent files 712 includes, for example, text to be displayed and a unique value indicating the language of the text. The number of the language-dependent files 712 corresponds to the number of languages that the print server function of the communication control device 100 supports. The language-dependent files 712 are stored in the language information area 12d (Web information storing unit) of the storage unit 12 of the communication control device 100.

With this configuration, the total data size of the Web information files 71 is expressed by the following formula: total data size=data size [bytes] of HTML files+(number of languages×data size [bytes] of language-dependent file) =data size [bytes] of program code+(number of languages× data size [bytes] of language-dependent data). Therefore, compared with the conventional method described above, this embodiment makes it possible to reduce the total data size of the Web information files 71. In other words, this embodiment makes it possible to efficiently provide information in multiple languages and thereby to solve the shortage of storage space in a communication control device.

As described above, Web information (Web information files 71) used in the Web system 900 of this embodiment comprises the common HTML files 711 that are program files to display information and the language-dependent files 712 that are language-dependent data representing information on the inkjet printer 200. The print server function of the communication control device 100 returns a common HTML file 711 or a language-dependent file 712 according to an information request from the user terminal 300n.

Referring back to FIG. 5 and based on the descriptions provided above with reference to FIGS. 6A and 6B, operations of the request analysis unit 531, the transmission information selecting unit 532, the language determining unit 533, and the transmission information generating unit 534 are described below.

The request analysis unit 531 analyzes an information request received by the Web information request receiving unit 51 and identifies information requested by the information request. More specifically, the request analysis unit 531 analyzes the character string of an information request, i.e. a URL, received by the Web information request receiving unit 51 (for example, extracts a base name and an extension from a file name specified in the URL) and thereby identifies a common HTML file 711 or a language-dependent file 712 that is requested by the information request. For example, when receiving a URL "http://aaa.bbb.ccc:xxxx/ddd/eee/fff/index_jpn.html", the request analysis unit 531 extracts the base name "index" and the extension "html" from the specified file name "index_jpn.html" and thereby identifies the common HTML file 711 "index.html" that is requested by the information request. The request analysis unit 531 sends the analysis result to the transmission information selecting unit 532.

The transmission information selecting unit 532 selects a common HTML file 711 or a language-dependent file 712 to be returned to the user terminal 300n based on the analysis result from the request analysis unit 531. Based on the type of the selected file (a common HTML file 711 or a language-dependent file 712), either a process of generating transmission information from a common HTML file 711 (HTML file generating process) or a process of generating transmission information from a language-dependent file 712 (language-dependent file generating process) is performed as described later.

The language determining unit 533 determines whether a language specified in an information request is supported by the print server function. The language determining unit 533, in a similar manner to that of the request analysis unit 531, analyzes the character string of a URL (for example, "http://aaa.bbb.ccc:xxxx/ddd/eee/fff/index_jpn.html"), extracts a language identifier (for example, "jpn"), which specifies a language, between an underscore "_" and a period "." before the extension (for example, "html") of a specified file name, and determines whether the language specified by the language identifier is supported. For example, a language identifier "jpn" indicates Japanese and a language identifier "eng" indicates English. Thus, the language determining unit 533 identifies the specified language based on a language identifier and determines whether the specified language is supported.

The transmission information generating unit 534 generates transmission information from a common HTML file 711 or a language-dependent file 712 selected by the transmission information selecting unit 532. If a common HTML file 711 is selected by the transmission information selecting unit 532, the transmission information generating unit 534 retrieves the selected common HTML file 711 (for example, "index.html") from the Web information area 12*c* where the common HTML files 711 are stored.

Then, the transmission information generating unit 534 inserts a language identifier between the base name and the extension of the file name of the retrieved common HTML file 711 based on the result from the language determining unit 533 to tell the user terminal 300*n* whether the specified language is supported. For example, when Chinese is specified in an information request and it is supported by the print server function, the transmission information generating unit 534 inserts a language identifier "chi" between the base name (for example, "index") and the extension (for example, "html") of the file name (for example, "index.html") of the retrieved common HTML file 711 and thereby generates a transmission information file name (for example, "index_chi.html") including the language identifier. On the other hand, when a language specified in an information request is not supported by the print server function, the transmission information generating unit 534 inserts a language identifier of a predetermined default language (for example, "eng" indicating English) between the base name and the extension and thereby generates a transmission information file name including the default language identifier (for example, "index_eng.html").

Then, the transmission information generating unit 534 embeds a character-set identifier (for example, "s-jis" for Japanese, "us-ascii" for English, or "iso-8859-1" for nine other countries) in the retrieved common HTML file 711 together with a modified file name, which is modified by inserting a language identifier in the original file name (for example, "DFxxx.js"), of the corresponding language-dependent file 712 that is to be displayed. For example, if Japanese is specified in an information request, the transmission information generating unit 534 embeds a character-set identifier "charset=s-jis" and the modified file name "DFxxx_jpn.js" of the corresponding language-dependent file 712 in the retrieved common HTML file 711 and thereby generates transmission information. If the language specified in an information request is not supported, the transmission information generating unit 534 embeds a character-set identifier for a predetermined default language (for example, "charset=us-ascii" for English) and a modified file name of the corresponding language-dependent file 712 and thereby generates transmission information.

Meanwhile, when a language-dependent file 712 is selected by the information selecting unit 532, the transmission information generating unit 534 retrieves the selected language-dependent file 712 (for example, "DFxxx.js") from the language information area 12*d* where the language-dependent files 712 are stored. Then, the transmission information generating unit 534 modifies the file name of the retrieved language-dependent file 712 by inserting a language identifier specified in the information request between the base name (for example, "DFxxx") and the extension (for example, "js") and thereby generates transmission information. In this case, unlike the process of generating transmission information from a common HTML file 711, data in the retrieved language-dependent file 712 are not modified. If the language specified in an information request is not supported by the print server function, the transmission information generating unit 534 retrieves a default language-dependent file 712 (for example, a language-dependent file 712 for English), modifies the file name of the default language-dependent file 712 by inserting a default language identifier (for example, "eng" indicating English) between the base name and the extension, and thereby generates a transmission information file name including the default language identifier.

As language identifiers to be inserted into transmission information file names by the transmission information generating unit 534, language codes defined, for example, by ISO-639 of the International Organization for Standardization (ISO) (corresponds to JIS X-0412 of Japan Industrial Standard (JIS)) may be used.

Thus, in the communication control device 100 of this embodiment, the common HTML files 711 that are program files to display information and the language-dependent files 712 that are language-dependent data representing information on the inkjet printer 200 are stored separately in storage areas. The Web information request receiving unit 51 of the communication control device 100 receives an information request via the network I/F 13 from the user terminal (information processing apparatus) 300*n*. The Web information generating unit 53 analyzes the received information request, selects a common HTML file 711 or a language-dependent file 712 based on the analysis result, retrieves the selected common HTML file 711 or language-dependent file 712 from the Web information area 12*c* or the language information area 12*d* (these areas are collectively called a Web information storing unit), and processes the retrieved file based on a language specified in the information request to generate transmission information. Then, the Web information sending unit 52 sends the generated transmission information via the network I/F 13 to the user terminal 300*n*. The Web information request receiving unit 51, the Web information generating unit 53, and the Web information sending unit 52 are collectively called a Web information returning unit.

FIG. 7 is a block diagram illustrating a functional configuration of the user terminal (information processing apparatus) 300*n*. FIGS. 8 and 9 are drawings illustrating exemplary screens of a Web browser of the user terminal (information processing apparatus) 300*n*.

First, a Web browser 91 shown in FIGS. 8 and 9 is described prior to descriptions of a functional configuration of the user terminal 300*n*.

The Web browser 91 of the user terminal 300*n* is an application program for viewing Web pages. The Web browser 91 downloads HTML files, image files, music files, etc., via the network 400 from servers, analyzes the downloaded files, and then displays or reproduces the analyzed files. Also, the Web browser 91 enables a user to send data to a Web server using a form and is capable of running a program written in, for example, JavaScript ("Java" is a registered trademark of Sun Microsystems, Inc.) or Flash.

Next, an exemplary functional configuration of the user terminal 300n is described with reference to FIG. 7.

The user terminal (information processing apparatus) 300n of this embodiment includes a Web information request inputting unit 61, a Web information display unit 62, a Web information request sending unit 63, a Web information receiving unit 64, and a Web program executing unit 65.

The Web information request inputting unit 61 receives an information request for information on the inkjet printer 200 via a user interface of the Web browser 91. More specifically, the Web information request inputting unit 61 receives an information request entered in an address bar 91a (an area enclosed by a dotted line in FIG. 8) of the Web browser 91 in the form of a URL (for example, "http://aaa.bbb.ccc:xxxx/ddd/eee/fff/index_jpn.html") indicating the storage location of a common HTML file 711 that is an information display program file for displaying information on the inkjet printer 200. In the URL, a language identifier (for example, "jpn" indicating Japanese) indicating a language used to display information is specified between the base name (for example, "index") and the extension (for example, "html) of the file name of the specified common HTML file 711.

The Web information display unit 62 displays information on the inkjet printer 200 received from the communication control device 100 in the Web browser 91. When a common HTML file 711, which is an information display program file for displaying information on the inkjet printer 200, is received from the communication control device 100, the common HTML file 711 is executed by the Web program executing unit 65 to generate information to be displayed (display information). The Web information display unit 62 displays the generated display information in a window of the Web browser 91. The Web information display unit 62, for example, displays a screen as shown in FIG. 9. The exemplary screen shown in FIG. 9 displays various information items on the inkjet printer 200 and includes a menu 91b (an area enclosed by a dotted line on the left side in FIG. 9) for selecting functions to make settings or to control operations of the inkjet printer 200, and a pull-down menu 91c (an area enclosed by a dotted line on the right side in FIG. 9) for selecting a language to be used to display information in the Web browser 91.

Referring back to FIG. 7, the Web information request sending unit 63 sends an information request to the communication control device 100 and the Web information receiving unit 64 receives information on the inkjet printer 100 in the form of Web information to be displayed in the Web browser 91 from the communication control device 100.

More specifically, the Web information request sending unit 63 sends, via the network I/F 33 of the user terminal 300n, an information request (for example, resource location information such as a URL "http://aaa.bbb.ccc:xxxx/ddd/eee/fff/index_jpn.html") for information on the inkjet printer 200 to the communication control device 100. The Web information receiving unit 64 receives, via the network I/F 33 of the user terminal 300n, information on the inkjet printer 200 sent from the communication control device 100 in response to an information request.

The Web program executing unit 65 includes a display language determining unit 651 and a language information obtaining unit 652 and executes a common HTML file 711 received by the Web information receiving unit 64.

The display language determining unit 651 determines whether information on the inkjet printer 200 can be displayed by the Web browser 91 of the user terminal 300n in the language specified. If a common HTML file 711 and a language-dependent file 712 to be read by the common HTML file 711, which are necessary to display information on the inkjet printer 200 in a specified language, have been correctly obtained from the communication control device 100, the display language determining unit 651 does not perform a process of determining whether the specified language is displayable. On the other hand, if a common HTML file 711 and a language-dependent file 712 to be read by the common HTML file 711 have not been correctly obtained from the communication control device 100, the display language determining unit 651 identifies the specified language based on a character set identifier (for example, charset=s-jis) embedded in the common HTML file 711 and/or a language identifier (for example, "jpn" indicating Japanese) inserted between the base name and the extension of the file name (for example, DFxxx_jpn.js) of a language-dependent file 712 specified in the common HTML file 711. Then, the display language determining unit 651 determines if the identified language is displayable by the Web browser 91 of the user terminal 300n. After determining whether the identified language is displayable, the display language determining unit 651 sends the result to the language information obtaining unit 652.

The language information obtaining unit 652 sends an information request to obtain a language-dependent file 712 that is necessary to display information on the inkjet printer 200 in the Web browser 91 of the user terminal 300n. More specifically, the language information obtaining unit 652 receives the result from the display language determining unit 651 and if the identified language is displayable (or supported), sends an information request to the communication control device 100 via the Web information request sending unit 63 to obtain the language-dependent file 712 specified in the common HTML file 711 to be executed. For example, the language information obtaining unit 652 sends resource location information (for example, a URL "http://aaa.bbb.ccc:xxxx/ddd/eee/fff/ggg/DFxxx_jpn.js") to obtain the language-dependent file 712. If the identified language is not displayable (or not supported), the language information obtaining unit 652 sends an information request to the communication control device 100 via the Web information request sending unit 63 to obtain a language-dependent file 712 of a predetermined default language (for example, English). In this case, the language information obtaining unit 652 inserts the language identifier of the default language (for example, "eng" indicating English) between the base name (for example, "DFxxx") and the extension (for example, "js") of the file name (for example, "DFxxx.js") of the language-dependent file 712 to be obtained and specifies the modified file name including the default language identifier in the resource location information.

After the language-dependent file 712 is obtained by the language information obtaining unit 652, the Web program executing unit 65 changes the character-set identifier embedded in the common HTML file 711 according to a unique value specified in the obtained language-dependent file 712 to indicate its language.

Thus, in the user terminal (information processing apparatus) 300n of this embodiment, the Web information request inputting unit 61 receives an information request for information on the inkjet printer (image forming apparatus) 200 entered in the address bar 91a of the Web browser 91, and the Web information request sending unit 63 sends the received information request via the network I/F 33 to the communication control device 100. The Web information request inputting unit 61 and the Web information request sending unit 63 are collectively called a Web information request unit. The Web information receiving unit 64 receives a common HTML file 711 sent from the communication control apparatus 100 in response to the information request. Next, the Web program executing unit 65 determines whether a language-dependent file 712 to be read by the common HTML file 711 has been received. If the language-dependent file 712 has not been received, the Web information request sending unit 63 sends an information request via the network I/F 33 to the communication control device 100 to obtain an appropriate language-dependent file 712.

<Web Information Display Process>

A conventional Web information display process and a Web information display process according to an embodiment of the present invention are described below with reference to sequence charts shown in FIGS. 10 and 11.

FIG. 10 is a sequence chart showing an exemplary conventional Web information display process.

In a conventional Web information display process, a user enters an information request for information on the inkjet printer 200 in the address bar 91a of the Web browser 91 of the user terminal 300n (1-1).

The user terminal 300n sends the information request received via the Web browser 91 to the communication control device 100 connected to the inkjet printer 200 and including a print server function (1-2 and 1-3).

When receiving the information request, the communication control device 100 sends an HTML file 711 containing both program code and language-dependent data to the user terminal 300n (1-4). The user terminal 300n receives the HTML file 711 and executes the received HTML file 711 by the Web browser 91 to display requested information on the inkjet printer 200 (1-5 and 1-6).

FIG. 11 is a sequence chart showing an exemplary Web information display process according to an embodiment of the present invention.

In a Web information display process of this embodiment, a user enters an information request for information on the inkjet printer 200 in the address bar 91a of the Web browser 91 of the user terminal 300n (2-1).

The user terminal 300n sends the information request received via the Web browser 91 to the communication control device 100 connected to the inkjet printer 200 and including a print server function (2-2 and 2-3).

When receiving the information request, the communication control device 100 sends a common HTML file 711 that is an information display program to the user terminal 300n (2-4). The user terminal 300n receives and executes the common HTML file 711 and determines whether a language-dependent file 712 specified in the common HTML file 711 has been obtained.

If the specified language file 712 has not been obtained from the communication control device 100, the user terminal 300n sends an information request to the communication control device 100 to obtain an appropriate language-dependent file 712 (2-5).

When receiving the information request, the communication control device 100 sends the requested language-dependent file 712 to the user terminal 300n (2-6). The user terminal 300n receives the language-dependent file 712. The received language-dependent file 712 is read into the common HTML file 711 being executed by the Web browser 91 and requested information on the inkjet printer 200 is displayed (2-7 and 2-8).

Thus, in the Web system 900 of this embodiment, information on the inkjet printer (information forming apparatus) 200 can be displayed, through a process as shown in FIG. 11, in the Web browser 91 of the user terminal (information processing apparatus) 300n in a language supported by the print server function of the communication control device 100.

<Processes in User Terminal and Communication Control Device>

Figure 12:
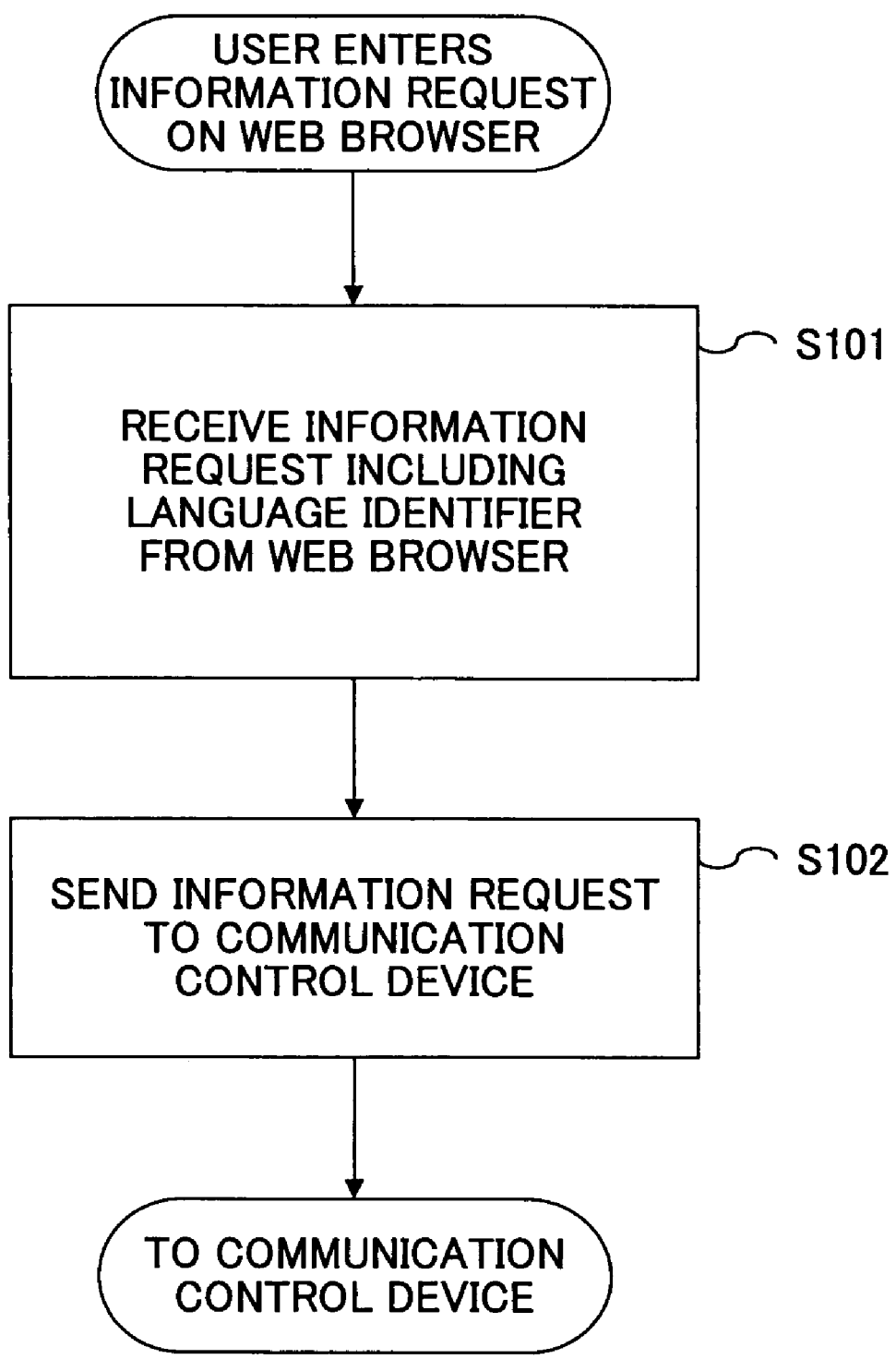
FIG. 12 is a flowchart showing an exemplary Web information requesting process performed by the exemplary user terminal (information processing apparatus)

FIG. 12 is a flowchart showing an exemplary Web information requesting process performed by the user terminal (information processing apparatus) 300n.

In the user terminal 300n, the Web information request inputting unit 61 receives an information request entered in the address bar 91a of the Web browser 91 in the form of a URL (for example, "http://aaa.bbb.ccc:xxxx/ddd/eee/fff/index_jpn.html") including a language identifier and indicating the storage location of a common HTML file 711 that is an information display program file for displaying information on the inkjet printer 200 (S101). Then, the Web information request sending unit 63 sends the received information request or the URL via the network I/F 33 to the communication control device 100 (S102).

Figure 13:
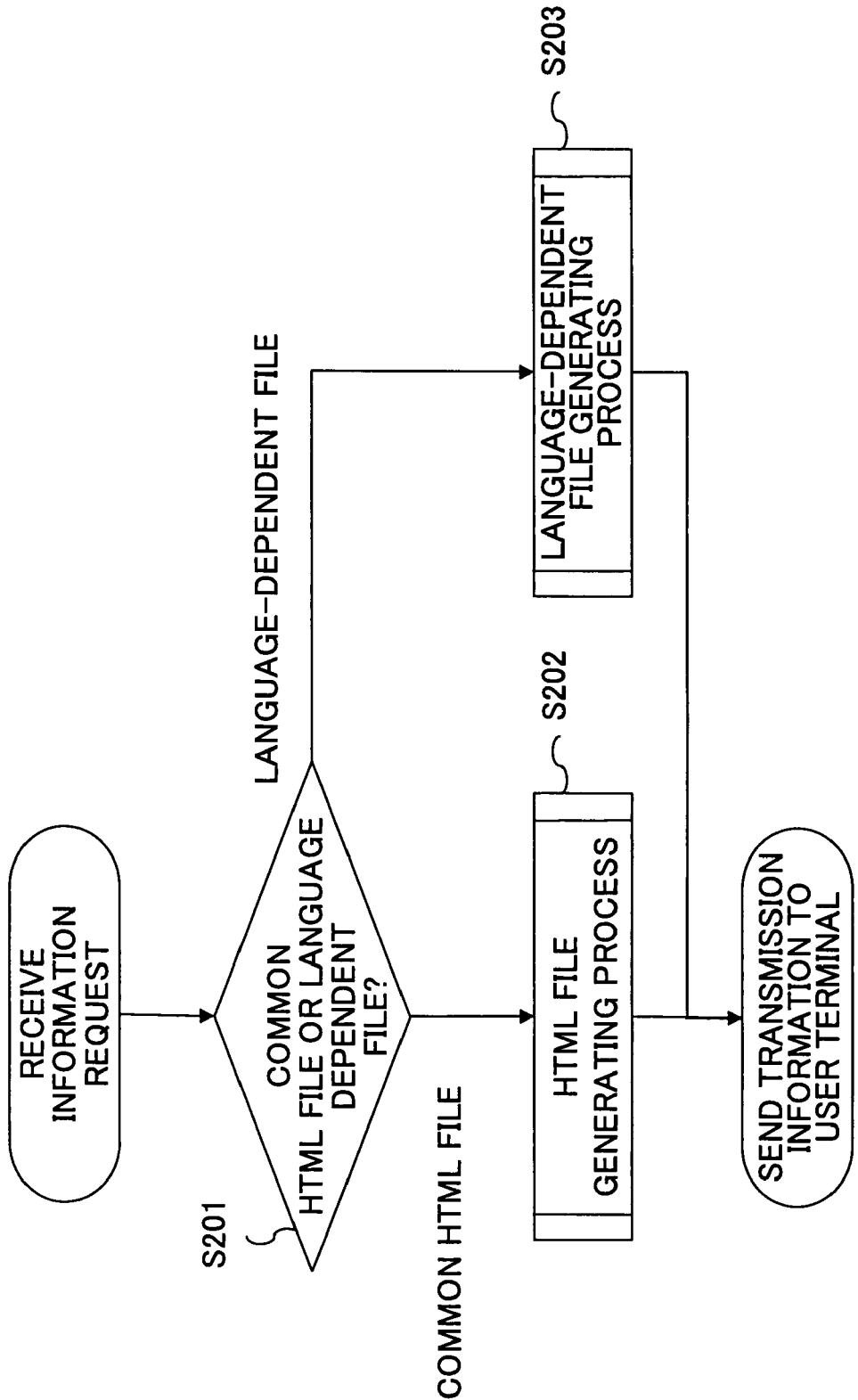
FIG. 13 is a flowchart showing an exemplary process performed by the exemplary communication control device in response to an information request.

FIG. 13 is a flowchart showing an exemplary process performed by the communication control device 100 in response to an information request.

In the communication control device 100, the Web information request receiving unit 51 receives an information request from the user terminal 300n. Then, the request analysis unit 531 of the Web information generating unit 53 analyzes the URL in the information request and thereby identifies a common HTML file 711 or a language-dependent file 712 that is requested by the information request based on the base name (for example, "index") and the extension (for example, "html") of a file name specified in the URL (S201).

Based on the analysis result from the request analysis unit 531, the transmission information selecting unit 532 selects a common HTML file 711 or a language-dependent file 712 and either an HTML file generating process or a language-dependent file generating process is performed (S202 and S203).

Figure 14:
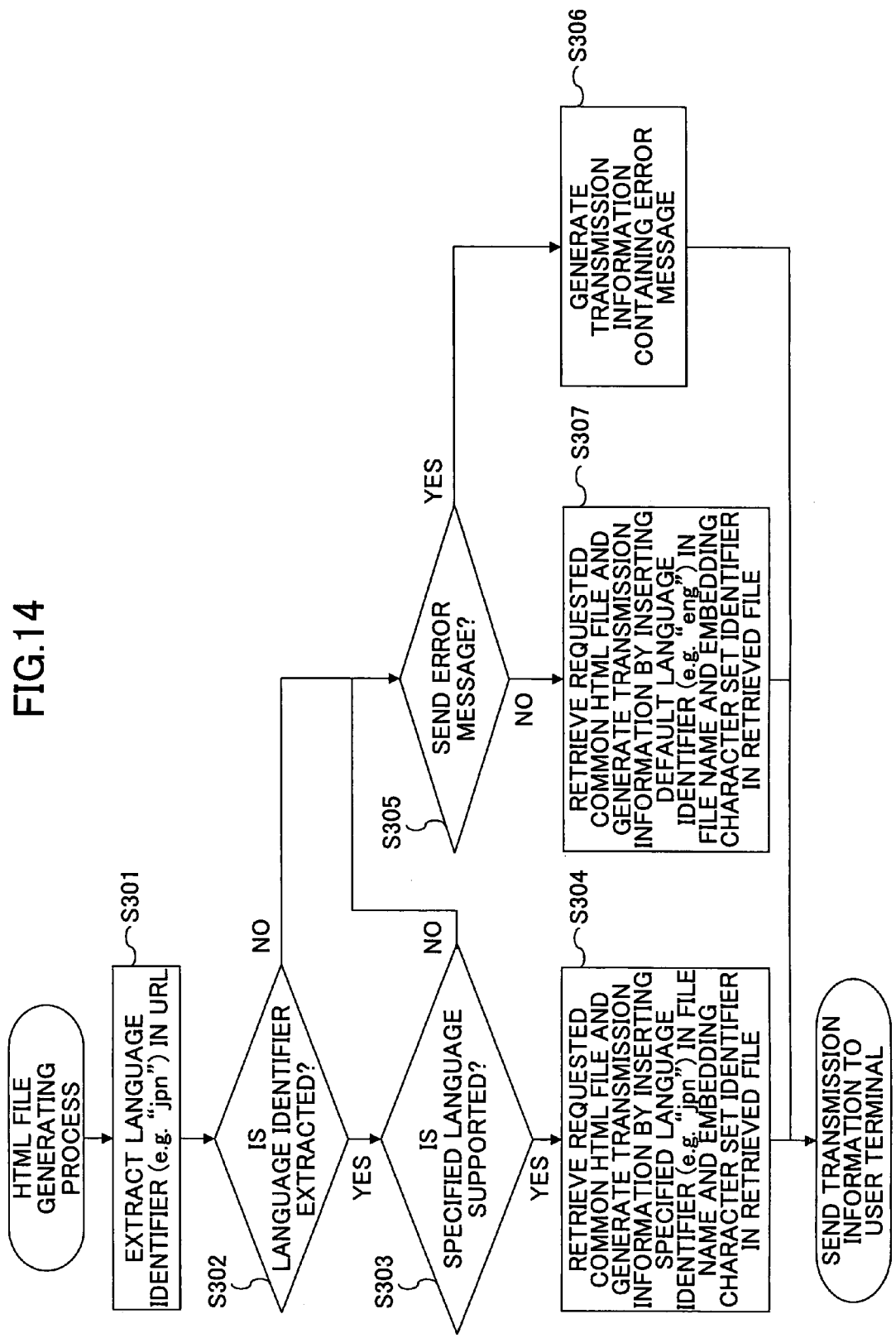
FIG. 14 is a flowchart showing an exemplary HTML file generating process performed by the exemplary communication control device.

FIG. 14 is a flowchart showing an exemplary HTML file generating process performed by the communication control device 100.

In the communication control device 100, the language determining unit 533 analyzes the character string of a URL (for example, "http://aaa.bbb.ccc:xxxx/ddd/eee/fff/index_jpn.html") received by the Web information request receiving unit 51 and extracts a language identifier (for example, "jpn") between an underscore "_" and a period "." before the extension (for example, "html") of a file name specified in the URL (S301). If a language identifier is extracted (YES in step S302), the language determining unit 533 determines whether the language specified by the language identifier is supported (S303).

If the specified language is supported (YES in step S303), the transmission information generating unit 534 retrieves a requested common HTML file 711 from a storage area, generates a transmission information file name (for example, "index_jpn.html) by inserting the specified language identifier (for example, "jpn") between the base name (for example, "index") and the extension (for example, "html") of the file name (for example, "index.html") of the retrieved common HTML file 711, and changes the file name of the retrieved common HTML file 711 to the generated transmission information file name. Also, the transmission information generating unit 534 embeds a character-set identifier (for example, "s-jis") in the common HTML file 711 together with a modified file name (for example, "DFxxx_jpn.js"), which is modified by inserting the specified language identifier in the original file name, of the corresponding language-dependent file 712, and thereby generates transmission information (S304).

If no language identifier is extracted by the language determining unit 533 (NO in step S302) or the specified language is not supported (NO in step S303), the transmission information generating unit 534 determines whether to send an error message to tell the user that the specified language is not supported (or cannot be displayed properly) (S305).

If YES in step S305, the transmission information generating unit 534 generates an HTML file containing an error message as transmission information (S306). The error message may be displayed by an image or by texts in all supported languages.

If NO in step S305, the transmission information generating unit 534 generates transmission information in substantially the same manner as in step S304 using a predetermined default language (for example, English) instead of the unsupported language (S307).

Then, the Web information sending unit 52 sends the transmission information (a processed common HTML file 711 or an HTML file containing an error message) generated by the transmission information generating unit 534 via the network I/F 13 to the user terminal 300n.

Figure 15:
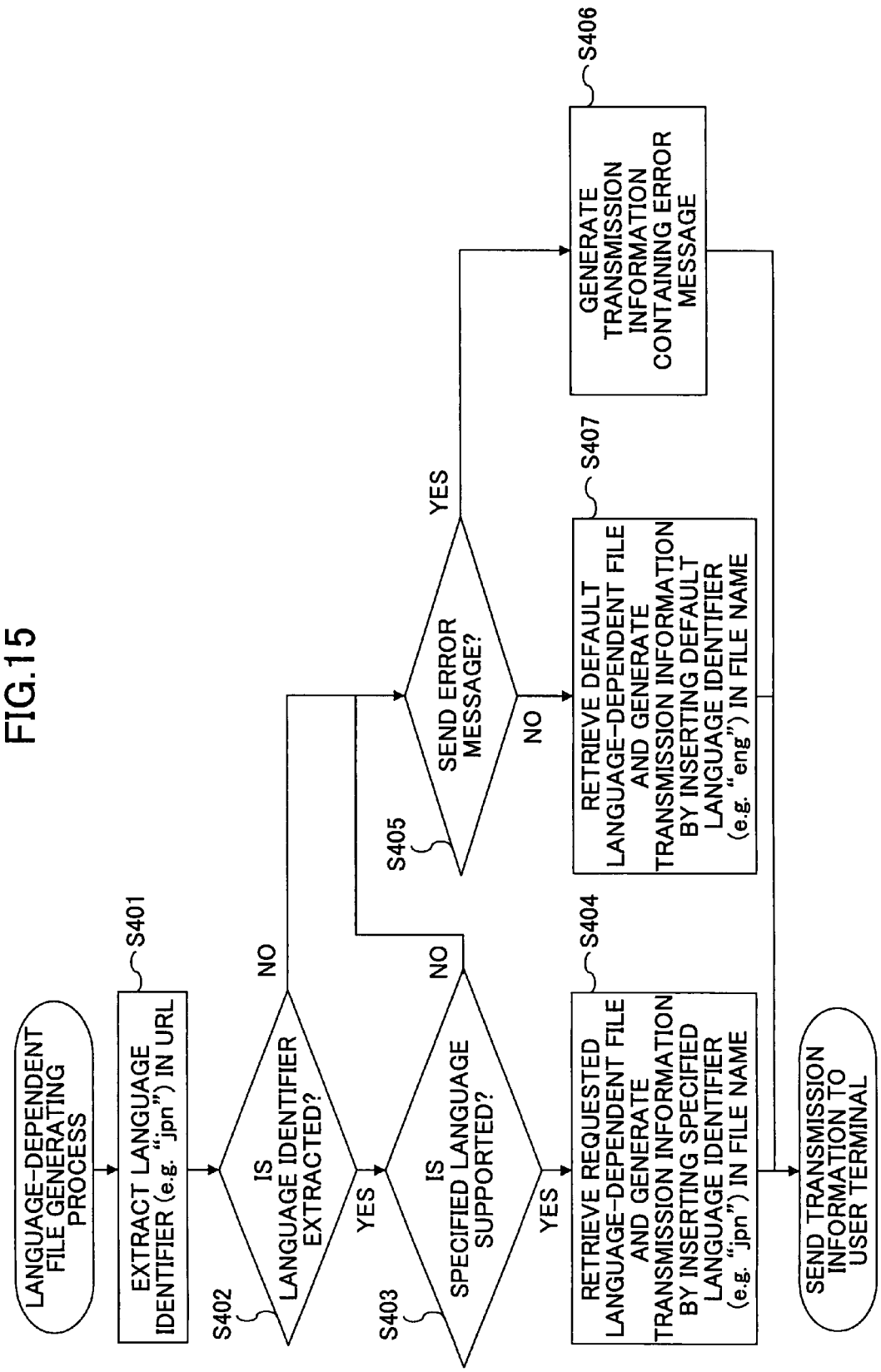
FIG. 15 is a flowchart showing an exemplary language-dependent file generating process performed by the exemplary communication control device.

FIG. 15 is a flowchart showing an exemplary language-dependent file generating process performed by the communication control device 100.

In the communication control device 100, the language determining unit 533 analyzes the character string of a URL (for example, "http://aaa.bbb.ccc:xxxx/ddd/eee/fff/ggg/DFxxx_jpn.js") received by the Web information request receiving unit 51 and extracts a language identifier (for example, "jpn") between an underscore "_" and a period "." before the extension (for example, "js") of a file name specified in the URL (S401). If a language identifier is extracted (YES in step S402), the language determining unit 533 determines whether the language specified by the language identifier is supported (S403).

If the specified language is supported (YES in step S403), the transmission information generating unit 534 retrieves a requested language-dependent file 712 from a storage area, generates a transmission information file name (for example, "DFxxx_jpn.js) by inserting a language identifier (for example, "jpn") between the base name (for example, "DFxxx") and the extension (for example, "js") of the file name (for example, "DFxxx.js") of the retrieved language-dependent file 712, changes the file name of the retrieved language-dependent file 712 to the generated transmission information file name, and thereby generates transmission information (S404).

If no language identifier is extracted by the language determining unit 533 (NO in step S402) or the specified language is not supported (NO in step S403), the transmission information generating unit 534 determines whether to send an error message to tell the user that the specified language is not supported (or cannot be displayed properly) (S405).

If YES in step S405, the transmission information generating unit 534 generates an HTML file containing an error message as transmission information (S406). The error message may be displayed by an image or by texts in all supported languages.

If NO in step S405, the transmission information generating unit 534 generates transmission information in substantially the same manner as in step S404 using a predetermined default language (for example, English) instead of the unsupported language (S407).

Then, the Web information sending unit 52 sends the transmission information (a processed language-dependent file 712 or an HTML file containing an error message) generated by the transmission information generating unit 534 via the network I/F 13 to the user terminal 300n.

Figure 16:
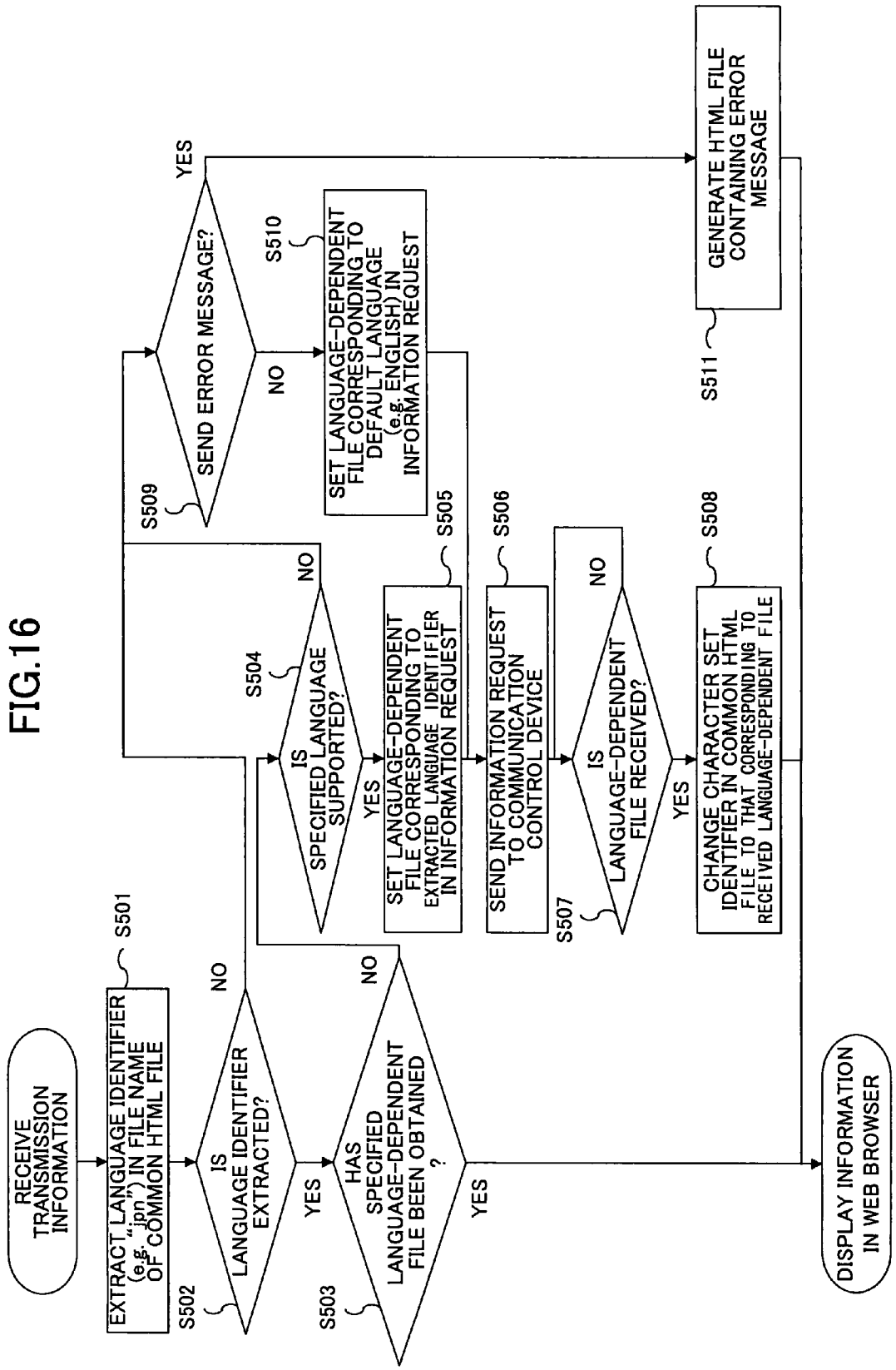
FIG. 16 is a flowchart showing an exemplary Web information displaying process performed by the exemplary user terminal (information processing apparatus)

FIG. 16 is a flowchart showing an exemplary Web information displaying process performed by the user terminal (information processing apparatus) 300n.

In the user terminal 300n, the display language determining unit 651 extracts a character set identifier (for example, charset=s-jis) embedded in the common HTML file 711 received by the Web information receiving unit 64 and a language identifier (for example, "jpn") inserted between the base name (for example, "DFxxx") and the extension (for example, "js") of the file name (for example, DFxxx_jpn.js) of a language-dependent file 712 specified in the common HTML file 711 (S501). If a language identifier is extracted (YES in step S502), the display language determining unit 651 determines whether the specified language-dependent file 712 has been obtained from the communication control device (S503). If the specified language-dependent file 712 has been obtained (YES in step S503), the language-dependent file 712 is read into the common HTML file 711 being executed by the Web program executing unit 65 and display information is generated. The Web information display unit 62 displays the generated display information in the Web browser 91.

If the specified language-dependent file 712 has not been obtained (NO in step S503), the display language determining unit 651 determines whether the language specified in the common HTML file 711 is displayable by the user terminal 300n (S504).

If the specified language is displayable (YES in step S504), the display language determining unit 651 sets the language-dependent file 712 corresponding to the extracted language identifier (the language-dependent file 712 corresponding to the common HTML file 711 being executed) in an information request (S505) and the language information obtaining unit 652 sends the information request via the Web information sending unit 63 to the communication control device 100 (S506).

When the requested language-dependent file 712 is sent from the communication control device 100, the Web information receiving unit 64 receives the language-dependent file 712 (S507) and the Web program executing unit 65 changes the character-set identifier embedded in the common HTML file 711 being executed according to a unique value specified in the received language-dependent file 712 and indicating the language used in the language-dependent file 712 (S508). Then, the Web information display unit 62 displays information generated by the common HTML file 711 and the language-dependent file 712 in the Web browser 91.

If no language identifier is extracted (NO in step S502) or the specified language is not displayable (NO in step S504), the display language determining unit 651 determines whether to send an error message to tell the user that no language is specified (or that the specified language cannot be displayed properly) (S509).

If YES in step S509, the Web information display unit 62 generates an HTML file containing an error message (S511) and displays the HTML file in the Web browser 91. The error message may be displayed by an image or by texts in all supported languages.

If NO in step S509, the display language determining unit 651 sets a language-dependent file 712 corresponding to a predetermined default language (for example, English) instead of the unsupported language (S510) in an information request and the language information obtaining unit 652 sends the information request via the Web information sending unit 63 to the communication control device 100 (S506). In this case, the requested information is displayed in the default language in the Web browser 91.

<Variations>

Variations of the above embodiments are described below with reference to FIGS. 17 and 18.

Figure 17:
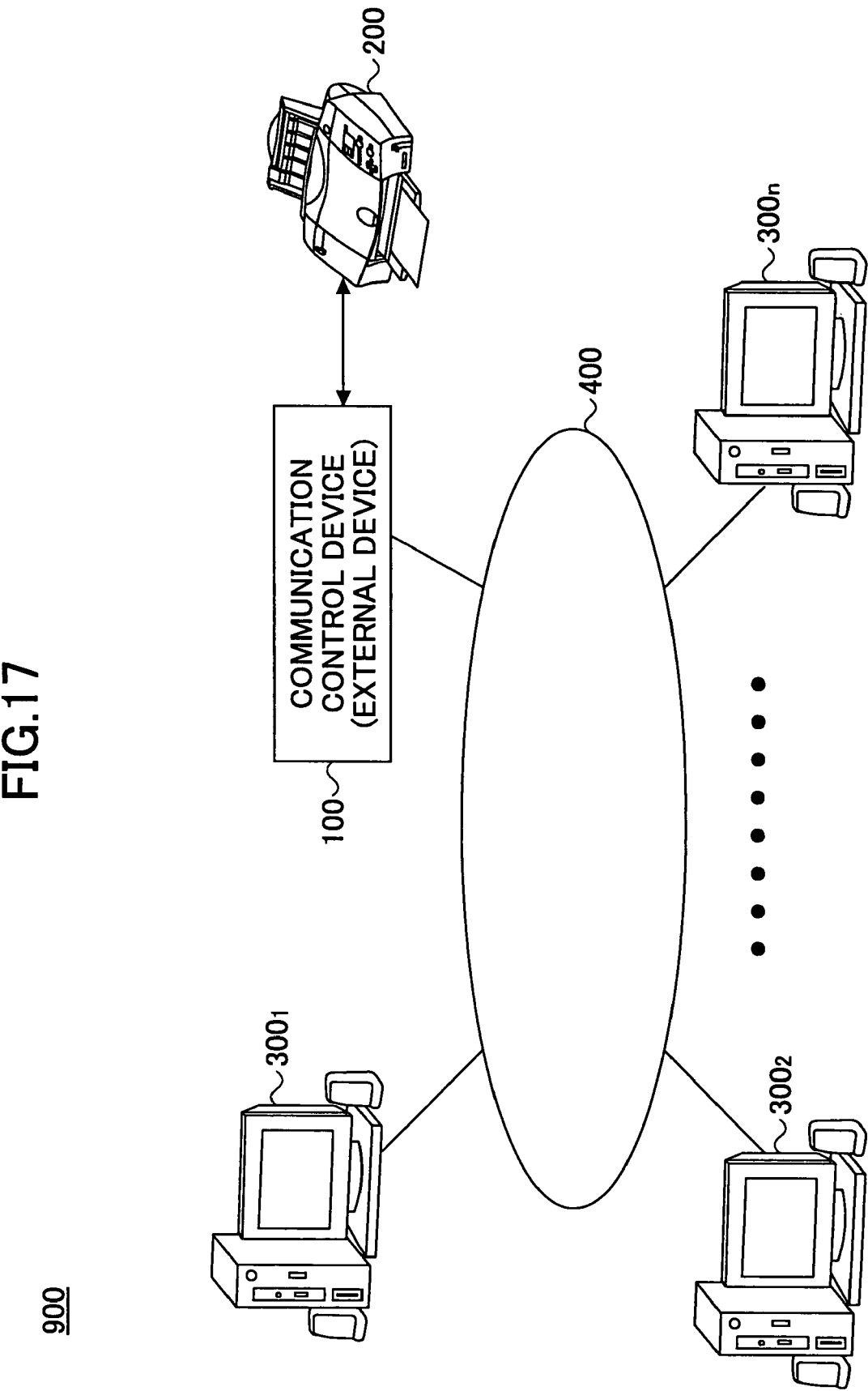
FIG. 17 is a drawing illustrating a variation of the exemplary Web system according to an embodiment of the present invention.

FIG. 17 is a drawing illustrating a variation of the Web system 900 according to an embodiment of the present invention. FIG. 18 is a block diagram illustrating a hardware configuration of a variation of the inkjet printer (image forming apparatus) 200 according to an embodiment of the present invention.

In the Web system 900 shown in FIG. 1, the inkjet printer 200 is connected to the network 400 via the communication control device 100 inserted in an expansion slot of the inkjet printer 200.

In a variation of the Web system 900 shown in FIG. 17, the communication control device 100 is connected via a data transmission path such as a USB to the inkjet printer 200 as an external device. In this case, for example, the image forming apparatus I/F 14 of the communication control device 100 is implemented as a USB interface and is connected to the external apparatus I/F 25 of the inkjet printer 200 as shown in FIG. 18. This configuration provides the same advantageous effects as those provided by the configuration shown in FIG. 1.

As described above, the Web system 900 according to an embodiment of the present invention includes the user terminals (information processing apparatuses) 300n and the inkjet printer (image forming apparatus) 200 equipped with the communication control device 100 having a print server function, which are connected to each other via the network 400. In the Web system 900, the user sends an information request with a language identifier via the Web browser 91 of the user terminal 300n to the communication control device 100 to obtain information on the inkjet printer 200. When receiving the information request, the communication control device 100 sends the Web information files 71, which include a common HTML file 711 that is a program for displaying the requested information on the inkjet printer 200 and a language-dependent file 712 corresponding to the language specified by the language identifier, to the user terminal 300n. Based on the Web information files 71 sent from the communication control device 100, the user terminal 300n displays information on the inkjet printer 200 in the Web browser 91.

More specifically, in the user terminal 300n, the Web information request inputting unit 61 receives the information request for information on the inkjet printer 200 entered in the address bar 91a of the Web browser 91, and the Web information request sending unit 63 sends the received information request via the network I/F 33 to the communication control device 100. The Web information request inputting unit 61 and the Web information request sending unit 63 are collectively called a Web information request unit. The Web information receiving unit 64 receives a common HTML file 711 sent from the communication control apparatus 100 in response to the information request. Then, the Web program executing unit 65 determines whether a language-dependent file 712 to be read by the common HTML file 711 has been received. If the language-dependent file 712 has not been received, the Web information request sending unit 63 sends an information request via the network I/F 33 to the communication control device 100 to obtain an appropriate language-dependent file 712.

In the communication control device 100, the common HTML files 711 that are program files to display information and the language-dependent files 712 that are language-dependent data representing information on the inkjet printer 200 are stored separately in storage areas. The Web information request receiving unit 51 of the communication control device 100 receives an information request via the network I/F 13 from the user terminal 300n. The Web information generating unit 53 analyzes the received information request, selects a common HTML file 711 or a language-dependent file 712 based on the analysis result, retrieves the selected common HTML file 711 or language-dependent file 712 from the Web information area 12c or the language information area 12d (these areas are collectively called a Web information storing unit), and processes the retrieved file based on a language specified in the information request to generate transmission information. Then, the Web information sending unit 52 sends the generated transmission information via the network I/F 13 to the user terminal 300n. The Web information request receiving unit 51, the Web information generating unit 53, and the Web information sending unit 52 are collectively called a Web information returning unit.

Thus, in the Web system 900 of this embodiment, information on the inkjet printer 200 to be displayed in the Web browser 91 of the user terminal 300n is provided in multiple languages in a storage-efficient manner taking into account the size of storage space allocated to the print server function of the communication control device 100.

Functional units or process steps in the Web system 900 according to embodiments of the present invention can be implemented by program code written in a programming language that is supported by the platform of the Web system 900 and the program code can be provided in a computer-readable storage medium.

An embodiment of the present invention provides a Web system including a user terminal (information processing apparatus) and an image forming apparatus equipped with a communication control device having a print server function that provides information on the image forming apparatus in the form of Web information for display by a Web browser of the user terminal. In the Web system, information (Web information) on the image forming apparatus is provided in multiple languages in a storage-efficient manner so as not to cause a shortage of storage space allocated to the print server function.

According to another embodiment of the present invention, the Web information is implemented by an HTML file that is an information display program for displaying the information on the image forming apparatus and language-dependent files that are data representing the information on the image forming apparatus in respective languages.

This configuration makes it possible to minimize the increase in data size of the Web information (or the increase in the amount of storage space used by the printer server) even when the number of languages is increased. In other words, this configuration eliminates the need to take measures, such as limiting the Web information to minimum necessary items, removing functions that consume storage space, and increasing the storage capacity, in response to multilingualization of the Web information, and thereby prevents an increase in production costs.

Embodiments of the present invention provide a Web system, a communication control device, an information processing apparatus, a communication control method, and a storage medium containing a communication control program. The Web system includes an information processing apparatus and an image forming apparatus equipped with the communication control device. The communication control device includes a print server function that provides information on the image forming apparatus in the form of Web information for display by a Web browser of the information processing apparatus. In the Web system, the Web information is provided in multiple languages in a storage-efficient manner so as not to cause a shortage of storage space allocated to the print server function.

The present invention is not limited to the specifically disclosed embodiments, and variations and modifications may be made without departing from the scope of the present invention.

The present application is based on Japanese Priority Application No. 2006-274020, filed on Oct. 5, 2006, the entire contents of which are hereby incorporated herein by reference.

What is claimed is:

1. A Web system, comprising:
an image forming apparatus;
a communication control device connected to the image forming apparatus and including a print server function; and
an information processing apparatus connected via a network and the communication control device to the image forming apparatus and configured to obtain information on the image forming apparatus in the form of Web information from the communication control device and to display the Web information in a Web browser of itself; wherein
the information processing apparatus includes a Web information request unit configured to send a Web information request via the network to the communication control device to obtain the Web information, the Web information request including a language identifier indicating a language to be used to display the Web information in the Web browser; and
the communication control device includes
a Web information storing unit configured to store the Web information,
a Web information generating unit configured to retrieve the Web formation from the Web information storing unit in response to the Web information request, generate transmission information from the retrieved Web information, extract the language identifier from the Web information request and determine whether the language indicated by the extracted language identifier is supported by the print server function of the communication control device, and
a Web information sending unit configured to send the generated transmission information via the network to the information processing apparatus,
wherein the Web information stored in the Web information storing unit comprises (i) an HTML file that is an information display program for displaying the information on the image forming apparatus and (ii) language-dependent files that are data representing the information on the image forming apparatus in respective languages,
wherein if the language indicated by the extracted language identifier is supported by the print server function, the Web information generating unit generates a file name of the transmission information by inserting the extracted language identifier into a file name of the HTML file or one of the language-dependent files, and
if the language indicated by the extracted language identifier is not supported by the print server function, the Web information generating unit generates the file name of the transmission information by inserting a predetermined default language identifier into the file name of the HTML file or one of the language-dependent files.

2. The Web system as claimed in claim 1, wherein the Web information sending wilt is configured to process the Web information retrieved from the Web information storing unit based on the language identifier.

3. A communication control device connected to an image forming apparatus and including a print server function for sending information on the image forming apparatus in the form of Web information via a network to an information processing apparatus where the Web information is displayed in a Web browser, the communication control device comprising:
a storage unit configured to store the Web information;
a Web information request receiving unit configured to receive a Web information request for the Web information from the information processing apparatus via the network;
a Web information generating unit configured to retrieve the Web information from the storage unit bused on the Web information request and to generate transmission information from the retrieved Web information; and
a Web information sending unit configured to send the generated transmission information via the network to the information processing apparatus,
wherein the Web information stored in the storage unit comprises (i) an HTML file that is an information display program for displaying the information on the image forming apparatus and (ii) language-dependent files that are data representing the information on the image forming apparatus in respective languages,
wherein the Web information request received by the Web information request receiving unit includes a language identifier indicating a language to be used to display the Web information in the Web browser, and the Web information generating unit is configured to extract the language identifier from the Web information request and to determine whether the language indicated by the extracted language identifier is supported by the print server function of the communication control device,
wherein if the language indicated by the extracted language identifier is supported by the print server function, the Web information generating, unit generates a file name of the transmission information by inserting the extracted language identifier into a file name of the HTML file or one of the language-dependent files, and
if the language indicated by the extracted language identifier is not supported by the print server function, the Web information generating unit generates the file name of the transmission information by inserting a predetermined default language identifier into the file name of the HTML file or one of the language-dependent files.

4. The communication control device as claimed in claim 3, wherein
the Web information request is a URL including the language identifier; and
the Web information generating unit includes a request analysis unit configured to analyze a character string of the URL received by the Web information request receiving unit and thereby to identify the HTML file or one of the language-dependent files that is requested as the Web information by the information processing apparatus.

5. The communication control device as claimed in claim 4, wherein the Web information generating unit further includes
  a language determining unit configured to extract the language identifier from the URL and to determine whether the language indicated by the extracted language identifier is supported by the print server function of the communication control device; and
  a transmission information generating unit configured to process the HTML file or one of the language-dependent files that is identified by the request analysis unit according to the determination result from the language determining unit and thereby to generate the transmission information to be sent to the information processing apparatus.

6. The communication control device as claimed in claim 3, wherein the transmission information generating unit is configured to generate the file name of the transmission information by inserting the predetermined default language identifier into the file name of the HTML file or one of the language-dependent files if the language determining unit is not able to extract the language identifier.

7. The communication control device as claimed in claim 5, wherein if the one of the HTML file or one of the language-dependent files identified by the request analysis unit is the HTML file and the language indicated by the extracted language identifier is supported by the print server function, the transmission information generating unit embeds information regarding the language indicated by the extracted language identifier in the HTML file.

8. The communication control device as claimed in claim 7, wherein if the HTML file or one of the language-dependent files identified by the request analysis unit is the HTML file and the language indicated by the extracted language identifier is not supported by the print server fraction, the transmission information generating unit embeds information regarding a language indicated by a predetermined default language identifier in the HTML file.

9. The communication control device as claimed in claim 8, wherein if the HTML file or one of the language-dependent files identified by the request analysis unit is the HTML file and if the language determining unit is not able to extract the language identifier, the transmission information generating unit embeds information regarding the language indicated by the predetermined default language identifier in the HTML file.

10. A storage medium having program code embodied therein for causing a computer to perform a print server function of a communication control device connected to an image forming apparatus and including a storage unit for storing information on the image forming apparatus in the form of Web information, which print server function sends the Web information via a network to an information processing apparatus where the Web information is displayed in a Web browser, the program code comprising:
  a Web information request receiving code unit configured to receive a Web information request for the Web information from the information processing apparatus via the network;
  a Web information generating code unit, configured to retrieve the Web information from the storage unit based on the Web information request and to generate transmission information from the retrieved Web information; and
  a Web information sending code unit configured to send the generated transmission information via the network to the information processing apparatus.
  wherein the Web information stored in the storage unit comprises (i) an HTML file that is an information display program for displaying the information on the image forming apparatus and (ii) language-dependent files that are data representing the information on the image forming apparatus in respective languages,
  wherein the Web information request received by the Web information request receiving code unit includes a language identifier indicating a language to be used to display the Web information in the Web browser, and the Web information generating code unit is configured to extract the language identifier from the Web information request and to determine whether the language indicated by the extracted language identifier is supported by the print server function of the communication control device,
  wherein if the language indicated by the extracted language identifier is supported by the print server function, the Web information generating code unit generates a file name of the transmission information by inserting the extracted language identifier into a file name of the HTML file or one of the language-dependent files, and
  if the language indicated by the extracted language identifier is not supported by the print server function, the Web information generating code unit generates the file name of the transmission information by inserting a predetermined default language identifier into the file name of the HTML file or one of the language-dependent files.

* * * * *